US011214663B2

(12) United States Patent
Nair et al.

(10) Patent No.: US 11,214,663 B2
(45) Date of Patent: Jan. 4, 2022

(54) METHOD AND SYSTEM FOR MAKING LIGHT-BLOCKING ARTICLES

(71) Applicant: Eastman Kodak Company, Rochester, NY (US)

(72) Inventors: Mridula Nair, Penfield, NY (US); Joseph Salvatore Sedita, Albion, NY (US); Mary Christine Brick, Webster, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 297 days.

(21) Appl. No.: 16/408,516

(22) Filed: May 10, 2019

(65) Prior Publication Data

US 2019/0263988 A1 Aug. 29, 2019

Related U.S. Application Data

(63) Continuation-in-part of application No. 15/283,496, filed on Oct. 3, 2016, now abandoned.

(51) Int. Cl.
| | |
|---|---|
| *C08J 9/30* | (2006.01) |
| *C09D 101/14* | (2006.01) |
| *C09D 167/00* | (2006.01) |
| *C09D 133/20* | (2006.01) |
| *C08J 9/00* | (2006.01) |
| *C09D 7/40* | (2018.01) |
| *C09D 5/32* | (2006.01) |
| *D06N 3/00* | (2006.01) |
| *D06N 3/04* | (2006.01) |

(52) U.S. Cl.
CPC .............. *C08J 9/30* (2013.01); *C08J 9/0004* (2013.01); *C08J 9/0061* (2013.01); *C08J 9/0066* (2013.01); *C09D 5/32* (2013.01); *C09D 7/69* (2018.01); *C09D 7/70* (2018.01); *C09D 101/14* (2013.01); *C09D 133/20* (2013.01); *C09D 167/00* (2013.01); *D06N 3/0006* (2013.01); *D06N 3/0036* (2013.01); *D06N 3/0045* (2013.01); *D06N 3/0047* (2013.01); *D06N 3/0063* (2013.01); *D06N 3/0065* (2013.01); *D06N 3/0068* (2013.01); *D06N 3/042* (2013.01); *C08J 2201/026* (2013.01); *C08J 2301/14* (2013.01); *C08J 2333/20* (2013.01); *C08J 2367/00* (2013.01); *C08J 2401/10* (2013.01); *D06N 2201/042* (2013.01); *D06N 2209/0853* (2013.01); *D06N 2211/122* (2013.01); *D06N 2211/125* (2013.01)

(58) Field of Classification Search
CPC . C09D 7/69; D06N 3/0045; D06N 2209/0853
See application file for complete search history.

(56) References Cited

U.S. PATENT DOCUMENTS

| | | |
|---|---|---|
| 3,296,023 A | 1/1967 | Leaderman et al. |
| 3,527,654 A | 9/1970 | Jones et al. |
| 3,607,341 A | 9/1971 | Goins et al. |
| 3,615,970 A | 10/1971 | May |
| 3,713,868 A | 1/1973 | Gordon et al. |
| 3,748,217 A | 7/1973 | May et al. |
| 3,862,291 A | 1/1975 | Brandon, Jr. et al. |
| 4,056,646 A | 11/1977 | Westfall et al. |
| 4,099,913 A | 7/1978 | Walter et al. |
| 4,137,380 A | 1/1979 | Gunning et al. |
| 4,362,774 A | 12/1982 | Brandon, Jr. et al. |
| 4,397,346 A | 8/1983 | Chumbley et al. |
| 4,409,275 A | 10/1983 | Samowich |
| 4,439,473 A | 3/1984 | Lippman |
| 4,457,980 A | 7/1984 | Daniels et al. |
| 4,572,846 A | 2/1986 | Foss et al. |
| 4,608,298 A | 8/1986 | Klaff |
| 4,677,016 A | 6/1987 | Ferziger et al. |
| 4,830,897 A | 5/1989 | Lichtenstein |
| 5,019,445 A | 5/1991 | Sternlieb |
| 5,132,163 A | 7/1992 | Leaderman et al. |
| 5,360,668 A | 11/1994 | Sternlieb |
| 5,565,265 A | 10/1996 | Rubin et al. |
| 5,576,054 A | 11/1996 | Brown |
| 5,741,582 A | 4/1998 | Leaderman et al. |
| 6,384,838 B1 | 5/2002 | Hannah |
| 6,439,269 B1 | 8/2002 | Weil et al. |
| 7,572,846 B2 | 8/2009 | Engelbrecht et al. |
| 7,754,409 B2 | 7/2010 | Nair et al. |
| 7,887,984 B2 | 2/2011 | Nair et al. |
| 8,252,414 B2 | 8/2012 | Putnam et al. |
| 8,329,783 B2 | 12/2012 | Nair et al. |
| 8,435,340 B2 | 5/2013 | Wheeler et al. |
| 8,614,039 B2 | 12/2013 | Nair et al. |
| 8,703,834 B2 | 4/2014 | Nair |
| 9,469,738 B1 | 10/2016 | Nair et al. |
| 9,891,350 B2 | 2/2018 | Lofftus et al. |
| 2002/0122949 A1 | 9/2002 | Richards |
| 2015/0234098 A1 | 8/2015 | Lofftus et al. |

FOREIGN PATENT DOCUMENTS

EP 1380616 11/1984

OTHER PUBLICATIONS

Noman Haleem et al., "Determining the Light Transmission of Woven Fabrics through Different Measurement Methods and Its Correlation with Air Permeability," Journal of Engineered Fibers and Fabrics, vol. 9, Issue 4, 2014, pp. 76-82.

*Primary Examiner* — Alex A Rolland
(74) *Attorney, Agent, or Firm* — J. Lanny Tucker

(57) ABSTRACT

A method is designed to prepare foamed, opacifying elements each having a target light blocking value ($LBV_T$) of at least 3, using a textile fabric substrate with a light blocking value ($LBV_S$). The $LBV_{T-S}$ difference is calculated; a foamable aqueous composition is chosen; a dry coating weight for the foamable aqueous composition (when foamed) is determined to form a single dry opacifying layer that is foamed, dried, and densified to provide a dry thickness at least 20% less than the original dry thickness. The single dry opacifying layer a has light blocking value that is equal to $LBV_{T-S}$, ±15%. The desired foamable aqueous composition can be chosen from a set of similar compositions to achieve the desired $LBV_T$ with the noted textile fabric substrate using suitable mathematical formula relating dry coating weight to light blocking value and a suitable data processor.

12 Claims, No Drawings

METHOD AND SYSTEM FOR MAKING LIGHT-BLOCKING ARTICLES

CROSS-REFERENCE TO RELATED APPLICATIONS

This is a Continuation-in-part of and commonly assigned U.S. Ser. No. 15/283,496 (filed Oct. 3, 2016, by Nair, Sedita, and Brick), now U.S. Patent Application Publication No. 2018/0094112, the disclosure of which is incorporated herein by reference in its entirety.

Reference is made also to the following commonly assigned patent applications:

U.S. Ser. No. 15/144,893 filed May 3, 2016 by Brick et al., now U.S. Pat. No. 10,233,590, which is a continuation-in-part of commonly assigned U.S. Ser. No. 14/730,280, filed Jun. 4, 2015, now abandoned.

U.S. Ser. No. 15/144,875 filed May 3, 2016 by Nair et al., now U.S. Pat. No. 9,469,738, which is a continuation-in-part of commonly assigned U.S. Ser. No. 14/730,269, filed Jun. 4, 2015, now abandoned;

U.S. Ser. No. 15/144,911 filed May 3, 2016 by Brick et al. now U.S. Pat. No. 10,308,781, which is a continuation-in-part of commonly assigned U.S. Ser. No. 14/730,280, filed Jun. 4, 2015, now abandoned;

U.S. Ser. No. 15/239,915 filed Aug. 18, 2016 by Nair et al., now U.S. Pat. No. 10,138,342;

U.S. Ser. No. 15/239,938 filed Aug. 18, 2016 by Nair et al., now U.S. Pat. No. 10,233,300;

U.S. Ser. No. 15/239,978 filed Aug. 18, 2016 by Nair et al. now U.S. Pat. No. 9,963,569; and U.S. Ser. No. 15/943,770 filed Apr. 3, 2018 by Nair, Brick, and Sedita, now U.S. Pat. No. 10,704,192;

the disclosures of all of which applications are incorporated herein by reference.

FIELD OF THE INVENTION

This invention relates to a method and system for providing dry foamed, opacifying elements that are specifically designed to have a target light blocking value ($LBV_T$) of at least 2. Such articles are provided using certain structural and optical parameters such as a textile fabric substrate having an inherent and determinable light blocking value ($LBV_S$) and a designed coating weight of a chosen foamed aqueous composition so that the $LBV_T$ is achieved.

BACKGROUND OF THE INVENTION

In general, when light strikes a surface, some of it may be reflected, some absorbed, some scattered, and the rest transmitted. Reflection can be diffuse, such as light reflecting off a rough surface such as a white wall, in all directions, or specular, as in light reflecting off a mirror at a definite angle. An opaque substance transmits almost no light, and therefore reflects, scatters, or absorbs all of it. Both mirrors and carbon black are opaque. Opacity can be characterized based on the frequency of the light being considered. "Blackout" or light blocking materials typically refer to coated layers in articles that are substantially impermeable to light such as visible or UV radiation. Thus, when a blackout material such as a blackout curtain is hung over a window, it generally blocks substantially all external light from entering the room through that window. Blackout materials are suitable as curtains and shades for domestic use, for institutional use in hospitals and nursing homes, as well as for use in commercial establishments such as hotels, movie theaters, and aircraft windows where the option of excluding light can be desirable.

Light blocking articles such as the blackout curtains can be comprised of a fabric (porous) substrate coated with more than one layer of a foamed latex composition. The function of a blackout curtain is to prevent sunlight from entering a room through a building window. It can also be desirable for the color (hue) of the back side to be light colored such as a shade of white or to match the external décor of the building or to match or complement the color of the textile fabric substrate.

Light colored blackout curtains are usually made by coating a fabric with white foams containing light scattering pigments such as titanium dioxide or clays. However, very thick foam coatings will be needed to create blackout curtains through which the sun is not visible in a darkened room using only these pigments. One method that is used to reduce the weight of such blackout materials is to sandwich a light-absorbing, foamed black or grey pigment, such as carbon black layer between two light scattering, white pigment-containing layers.

When an electromagnetic radiation blocking coating has, as it often does, a strongly light absorbing material containing black pigments such as carbon black, between two reflective layers, it has at least two distinct problems. First, such materials require three separate coating operations that reduce manufacturing productivity and increase unit costs. Secondly, carbon black in the light absorbing middle layer can become "fugitive" (or non-enclosed) from some puncture or tear occurring during sewing or laundering of the fabric, and soil other layers such as the reflective layers, which is highly objectionable. Additionally, the stitches generated in the materials during sewing can cause the fugitive carbon from the light absorbing layer to spread over a larger area thereby increasing the area of objectionable shading of the light-colored surface. Further, such materials provide only one level of light blocking when the fabric is coated. There are no varying degrees of light blocking (tunability) possible with these materials.

U.S. Pat. No. 7,754,409 (Nair et al.), U.S. Pat. No. 7,887,984 (Nair et al.), U.S. Pat. No. 8,252,414 (Putnam et al.), and U.S. Pat. No. 8,329,783 (Nair et al.) describe porous polymer particles that are made by a multiple emulsion process, wherein the multiple emulsion process provides formation of individual porous particles comprising a continuous polymer phase and multiple discrete internal pores, and such individual porous particles are dispersed in an external aqueous phase. The described Evaporative Limited Coalescence (ELC) process is used to control the particle size and distribution while a hydrocolloid is incorporated to stabilize the inner emulsion of the multiple emulsion that provides the template for generating the pores in the porous particles.

U.S. Pat. No. 9,891,350 (Lofftus et al.) describes improved articles that are designed with an opacifying layer that is capable of blocking predetermined electromagnetic radiation. The opacifying layer is disposed on a substrate that can be composed of any suitable material and a porous or non-porous underlying layer can be incorporated between the substrate and the opacifying layer. While these articles have numerous advantages and represent an important advance in the art, there is a need for further improvement in providing opacifying articles that are lighter in weight; and that have improved flexibility, good "hand," while maintaining light coloration of the surfaces facing an observer without losing reflectivity, and light-absorptive properties; launderability; and minimizing dark opacifying agents getting out into the environment upon stitching and handling.

U.S. Pat. No. 9,891,350 (noted above), formerly U.S. Patent Application Publication 2015/0234098 addresses light blocking coatings in isolation, without regard to the substrate they are disposed on and the extent of opacity provided by the substrate. The patent describes the use of substrates simply as carriers for the coating of interest to predict, using Kubelka-Munk (KM) equations, the thickness required to provide a certain level of transmission density $D_t$. While the patent goes on to predict a relationship between $D_t$ and layer thickness, it is based on only 2 data points (i.e. two coating weights, Col. 22, lines 50-58) and is limited to a narrow range between small estimated dry thicknesses and therefore, by inference, small changes in estimated dry coating weights (not measured). Anything outside that range is unknown and, using an equation for layer thicknesses generated from only 2 data points makes prediction less reliable. The patent points out that standard metrics to measure radiation blocking properties in transmission are not useful and that KM modeling is needed (Col. 7, lines 31-36). At the same time in contradiction, the patent uses (Col. 22, lines 50-67) transmission density measurements to predict the opacifying layer thickness needed for blocking predetermined electromagnetic radiation. The patent also does not elaborate on or disclose the thicknesses, or whether by thickness is meant physical or optical thickness (Col. 9, lines 15-37). The limitations of thickness are unknown from its teaching. There also appears to be another contradiction in limiting thin coatings by designing the opacifying layer to have thicknesses of at least 50 μm or greater (Col. 10, lines 26-27). Overall, there is no teaching in the patent to direct someone skilled in the art to an empirical method needed to determine a coating layer thickness required to provide a certain level of electromagnetic radiation blocking. Moreover, there is no teaching regarding the interaction of the coating with the substrate below. This is especially important when it comes to coating on different coating machines in terms of how the fabric is held during the coating and drying process, such as for bi or uniaxially stretching, followed by crushing and curing. Furthermore, the examples in the patent all utilize non-foamed highly porous particle filled coatings where the porous particles are present in an amount of at least 40 weight % based on the total dry weight of the dry opacifying layer and where an interstitial void volume between the porous particles of at least 5 volume % and less than 30 volume % is required to obtain the light blocking properties.

An improvement in this art is provided by the foamed aqueous compositions described and claimed in U.S. Pat. No. 9,469,738 (noted above) in which very small amounts of opacifying colorants are incorporated into porous particles, and the resulting light blocking composition has a foam density of at least 0.1 g/cm$^3$.

While the noted foamed compositions and foamed, opacifying elements described in the previous commonly assigned patent applications provide an advance in the art, there is continued need for improvements. Those foamed, opacifying elements were designed by experimentation with various porous substrates, foamed aqueous compositions, and coating weights.

Unlike the prior art, it would be advantageous to be able to make foamed opacifying elements that have a desired (or predetermined) level of opacity or light blocking value. The foamed compositions used in the present invention are tunable in that sense and can provide a target light blocking coating for a given textile fabric substrate. Therefore, it would be desirable to have a means for creating foamed, opacifying elements using a chosen textile fabric substrate and a chosen foamed aqueous composition to achieve a target (or tailored) light blocking value predictably, without resorting to trial and error, that may depend upon various compositional and manufacturing factors as well as economic or aesthetic values. In other words, it would be desirable to have a way to design such foamed, opacifying elements to satisfy a customer's needs for light blocking, costs, or fabric properties such as weight, hand, and feel.

SUMMARY OF THE INVENTION

The present invention provides a method for providing a foamed, opacifying element having a target light blocking value (LBV$_T$) and required physical properties, the foamed, opacifying element comprising a textile fabric substrate having a first supporting side and an opposing second supporting side, the method comprising:
providing a textile fabric substrate;
determining a light blocking value (LBV$_S$) of the textile fabric porous substrate;
choosing a target light blocking value (LBV$_T$) of at least 3 and greater than LBV$_S$;
calculating LBV$_{T-S}$ as a difference between LBV$_T$ and LBV$_S$;
choosing a foamable aqueous composition that provides the required physical properties in the foamed, opacifying element;
using an empirical mathematical formula to determine a dry coating weight of a single dry opacifying layer derived from the chosen foamable aqueous composition, of at least 40 g/m$^2$ and up to and including 300 g/m$^2$, in order to achieve the calculated LBV$_{T-S}$;
foaming the chosen foamable aqueous composition to form a foamed aqueous composition having a foam density of at least 0.1 g/m$^3$ and up to and including 0.4 g/cm$^3$;
applying an amount of the foamed aqueous composition to the first supporting side of the textile fabric substrate,
drying the applied foamed aqueous composition to provide the dry coating weight and a dry thickness of a dry layer; and
densifying the dry layer at a crushing pressure of at least 5 pounds per linear inch and up to and including 800 pounds per linear inch such that the dry layer dry thickness is reduced by at least 20%,
to form the single dry opacifying layer disposed on the first supporting side of the textile fabric substrate, such that the single dry opacifying layer has a light blocking value that is equal to LBV$_{T-S}$, ±15%, thereby forming the foamed, opacifying element having the target light blocking value (LBV$_T$).

In some embodiments, the chosen foamable aqueous composition has at least 35% solids and up to and including 70% solids, and comprises:

(a) at least 0.05 weight % and up to and including 35 weight % of porous particles, each porous particle comprising a continuous polymeric phase and a first set of discrete pores dispersed within the continuous polymeric phase, the porous particles having a mode particle size of at least 2 μm and up to and including 50 μm and a porosity of at least 20 volume % and up to and including 70 volume %, and the continuous polymeric phase having a glass transition temperature of at least 25° C.;

(b) at least 20 weight % of a binder material;
(c) at least 0.0001 weight % of one or more additives comprising at least one surfactant;
(d) water; and
(e) at least 0.001 weight % of an opacifying colorant different from all of the one or more (c) additives, which opacifying colorant absorbs predetermined electromagnetic radiation,
all amounts being based on the total weight of the chosen foamable aqueous composition.

The present invention also provides a system for providing a foamed, opacifying element having a target light blocking value ($LBV_T$), comprising:

(A) a set of foamable aqueous compositions, each of the foamable aqueous compositions independently having at least 35% solids and up to and including 70% solids, and independently comprising:
  (a) at least 0.05 weight % and up to and including 35 weight % of porous particles, each porous particle comprising a continuous polymeric phase and a first set of discrete pores dispersed within the continuous polymeric phase, the porous particles having a mode particle size of at least 2 μm and up to and including 50 μm and a porosity of at least 20 volume % and up to and including 70 volume %, and the continuous polymeric phase having a glass transition temperature of at least 25° C.;
  (b) at least 20 weight % of a binder material;
  (c) at least 0.0001 weight % of one or more additives comprising at least one surfactant;
  (d) water; and
  (e) at least 0.001 weight % of an opacifying colorant different from all of the one or more (c) additives, which opacifying colorant absorbs predetermined electromagnetic radiation,
  all amounts being based on the total weight of the foamable aqueous composition, and wherein each of the foamable aqueous compositions can be foamed to provide a foamed aqueous composition having a foam density of at least 0.1 g/cm³ and up to and including 0.4 g/cm³;

(B) a set of empirical mathematical formulae associated with the set of foamable aqueous compositions, wherein the set of mathematical formulae relate dry coating weight of the respective foamable aqueous compositions to respective light blocking values; and (C) a data processor configured to perform a method for generating the required dry weight of a single dry opacifying layer to provide the target light blocking value ($LBV_T$) and required physical properties, the method performed by the data processor comprising:
  providing a textile fabric substrate having a first supporting side and an opposing second supporting side;
  determining a light blocking value ($LBV_S$) of the textile fabric substrate;
  choosing a target light blocking value ($LBV_T$) of at least 3 and greater than $LBV_S$;
  calculating $LBV_{T-S}$ as a difference between $LBV_T$ and $LBV_S$;
  choosing a foamable aqueous composition that provides the required physical properties in the foamed, opacifying element
  using a mathematical formula to determine a dry coating weight of a single dry opacifying layer derived from the chosen foamable aqueous composition, of a least 40 g/m² and up to and including 300 g/m², in order to achieve the calculated $LBV_{T-S}$;
  foaming the chosen foamable aqueous composition to form a foamed aqueous composition having a foam density of at least 0.1 g/m³ and up to and including 0.4 g/cm³;
  applying an amount of the foamed aqueous composition to the first supporting side of the textile fabric substrate,
  drying the applied foamed aqueous composition to provide the dry coating weight and a dry thickness of a dry layer; and
  densifying the dry layer at a crushing pressure of at least 5 pounds per linear inch and up to and including 800 pounds per linear inch such that the dry layer dry thickness is reduced by at least 20%,
  to form the single dry opacifying layer disposed on the first supporting side of the textile fabric substrate, such that the single dry opacifying layer has a light blocking value that is equal to $LBV_{T-S}$, ±15%, thereby forming the foamed, opacifying element having the target light blocking value ($LBV_T$).

The present invention provides a means for taking the specific desires and specifications of a customer and making foamed, opacifying elements having desired overall light blocking capacity. Such elements can be designed with the desired textile fabric substrates and optimal dry thickness of a single dry opacifying layer to meet a target light blocking value ($LBV_T$) while considering various aesthetic or economic values and required physical properties of the final opacifying element. For example, for a given or chosen textile fabric substrate, a foamable aqueous composition (and corresponding foamed aqueous composition) can be chosen, and a specific coating weight can be determined using appropriate mathematical formulae and processors to achieve the desired $LBV_T$ no matter what the weight, weave, thickness, or color of that textile fabric substrate may be.

Thus, a heavier-weight textile fabric substrate with its greater inherent light blocking contribution may require a thinner dry opacifying layer while a lighter-weight textile fabric substrate may require a thicker dry opacifying layer. Such design choices are not possible using the technology of the prior art since the prior art dry opacifying layers are generally fixed as a middle carbon-containing, light-blocking layer between two outer protective layers to mask the dark color of this middle opacifying layer.

Depending on the specific application, a customer may impose physical property requirements for the opacifying element outside of the desired light blocking value. For example, the single dry opacifying layer should have good adhesion to the textile fabric substrate to ensure that the single dry opacifying layer does not delaminate during winding and unwinding, slitting, or fabrication operations as well as during storage and use. The single dry opacifying layer may also be required to have resistance to scratches, scuffs, abrasions, and permanent indentations/impressions as well as to cracking when folded or creased (single or multiple events). The foamed, opacifying element, in cases where drapery applications are envisioned, will be required to have a specified degree of stiffness which is usually lower than when the element is designed for window shades where, for example, stiffness is desired. Since finished foamed, opacifying elements may be stored in a wide range of environmental conditions, these materials must be able to withstand exposure to a wide range of temperatures both below and above room temperature without cracking (low temperature conditions), sticking (temperatures above room temperature), or degradation of any of the other properties mentioned above. It is also important that light blocking materials retain their specified mechanical properties and color/tint even after exposure to UV/Visible light for extended time periods. Thus, a single-layer foamed, opacifying element can be designed according to the present invention to meet desired physical properties in addition to the economic or aesthetic values, for example to provide (1) economic savings by coating only the required amount of foamable (or foamed) aqueous composition in the dry opacifying layer, (2) or a more luxurious feel to a lighter-weight textile fabric substrate by coating a heavier or thicker dry opacifying layer. The various desired factors can be carefully balanced to achieve a customer's needs.

Additionally, a foamable aqueous composition (and corresponding foamed aqueous composition) can be designed to impart a target light blocking value ($LBV_T$) at a specified thickness (or coating weight) of the resulting dry opacifying layer. With routine experimentation, one skilled in the art can determine a relationship between $LBV_T$ and dry coating weight of the dry opacifying layer and thereby readily design foamed, opacifying elements with any desired dry weight, material cost, light blocking value, and physical properties. These experimental data can be formulated as empirical mathematical formulae or put into a look-up table (LUT) that can be readily accessed or consulted for a given set of process conditions and factors to provide a set of dry coating weights for a set of possible foamable aqueous compositions. Further details of this method and system for using it are provided above.

In contrast to the teaching of U.S. Pat. No. 9,891,350 (noted above), the advantages of the present invention include the ability to predict the coating weight for a target LBV along with the desired physical properties for decorative fabrics of different weaves, colors, weights, thickness and $LBV_S$ values, whereas prediction of coating weights of LBV's cannot be done using the teaching of the noted above, especially in combination with desired physical properties The noted patent gives no hints of the interactions of the opacifying layer and the mode of application, with a textile fabric substrate. This is especially important when textile fabric substrates are to be coated under different configurations such as coating off tenter pins before entering a tenter frame for drying; or coating while being tentered (which is biaxially stretched in a tenter frame). The tenter frame usually consists of chains fitted with pins or clips to hold the selvages of the fabric while being transported through the dryers on tracks.

Additionally, foam densification and crushing pressures for decorative fabrics are critical for the resultant uniformity in LBV across the fabric. This makes predictability of coat weight for targeted light-blocking value LBV on decorative fabrics not straightforward.

The foamed, opacifying elements prepared according to the present invention comprise a single dry opacifying layer that can also have antimicrobial and flame-retardant properties as well as opacifying properties and other optical effects such as color variations.

DETAILED DESCRIPTION OF THE INVENTION

The following discussion is directed to various embodiments of the present invention and while some embodiments can be desirable for specific uses, the disclosed embodiments should not be interpreted or otherwise considered be limit the scope of the present invention, as claimed below. In addition, one skilled in the art will understand that the following disclosure has broader application than is explicitly described for any specific embodiment.

Definitions

As used herein to define various components of the foamed aqueous composition and foamable aqueous composition, or materials used to prepare the porous particles, unless otherwise indicated, the singular forms "a," "an," and "the" are intended to include one or more of the components (that is, including plurality referents).

Each term that is not explicitly defined in the present application is to be understood to have a meaning that is commonly accepted by those skilled in the art. If the construction of a term would render it meaningless or essentially meaningless in its context, the term definition should be taken from a standard dictionary.

The use of numerical values in the various ranges specified herein, unless otherwise expressly indicated otherwise, are considered to be approximations as though the minimum and maximum values within the stated ranges were both preceded by the word "about." In this manner, slight variations above and below the stated ranges can be used to achieve substantially the same results as the values within the ranges. In addition, the disclosure of these ranges is intended as a continuous range including every value between the minimum and maximum values.

Unless otherwise indicated, the terms "foamed, opacifying element," "element," and "article" are intended to refer to the same material.

Unless otherwise indicated, the terms "foamed aqueous composition" and "composition" are intended to be synonymous terms and to refer to the same material, and, are different from a "functional protective composition" as described below.

The terms "porous particle" and "porous particles" are used herein, unless otherwise indicated, to refer to porous organic polymeric materials useful in the foamable aqueous compositions, foamed aqueous compositions, and foamed opacifying elements prepared according to the present invention. The porous particles generally comprise a solid continuous polymeric phase having an external particle surface and discrete pores dispersed within the continuous polymeric phase. The continuous polymeric phase also can be chemically crosslinked or elastomeric in nature, or both chemically crosslinked and elastomeric in nature.

The continuous polymeric phase of the porous particles generally has the same composition throughout that solid phase. That is, the continuous polymeric phase is generally uniform in composition including any additives (for example, colorants) that can be incorporated therein. In addition, if mixtures of polymers are used in the continuous polymeric phase, generally those mixtures also are dispersed uniformly throughout.

As used in this disclosure, the term "isolated from each other" refers to the different (distinct) pores of same or different sizes that are separated from each other by some of the continuous polymeric phase, and such pores are not generally interconnected.

The terms "first discrete pore" and "second discrete pore" refer to distinct sets of isolated pores in the porous particles. These first and second discrete pores can refer to distinct individual pores, or in most embodiments, they refer to distinct sets of pores. Each distinct set of pores includes a plurality of pores, each of which pores is isolated from others pores in the set of pores, and the pores of each set of pores are isolated from all other pores of the other sets of pores in the porous particle. Each set of pores can have the same mode average size or both sets can have the same mode average size. The word "discrete" is also used to define different droplets of the first and second aqueous phases when they are suspended in the oil (solvent) phase (described below).

The porous particles can include "micro," "meso," and "macro" discrete pores, which according to the International Union of Pure and Applied Chemistry, are the classifications recommended for discrete pore sizes of less than 2 nm, from 2 nm to 50 nm, and greater than 50 nm, respectively. Thus, while the porous particles can include closed discrete pores of all sizes and shapes (that is, closed discrete pores entirely within the continuous polymeric phase) providing a suitable volume in each discrete pore, macro discrete pores are particularly useful. While there can be open macro pores on the surface of the porous particle, such open pores are not desirable and can be present only by accident. The size of the porous particle, the formulation, and manufacturing conditions are the primary controlling factors for discrete pore size. However, typically the discrete pores independently have an average size of at least 100 nm and up to and including 7,000 nm, or more likely at least 200 nm and up to and including 2,000 nm. Whatever the size of the discrete pores, they are generally distributed randomly throughout the continuous polymeric phase. If desired, the discrete pores can be grouped predominantly in one part (for example, "core" or "shell") of the porous particles.

The porous particles used in this invention generally have a porosity of at least 20 volume % and up to and including 70 volume %, or likely at least 40 volume % and up to and including 65 volume %, or more typically at least 45 volume % and up to an including 60 volume %, all based on the total porous particle volume. Porosity can be measured by the known mercury intrusion technique.

"Opacity" is a measured parameter of a foamed, opacifying element prepared according to the present invention that characterizes the extent of transmission of electromagnetic radiation such as visible light. A greater light blocking value indicates a more efficient blocking (hiding) of predetermined radiation (as described below). In the present invention, the "opacity" of a material is determined by measuring the light blocking value (LBV), as exemplified below, which determines the extent to which the impinging radiation or light is blocked by the material. The higher the LBV, the greater the light blocking ability exhibited by the material.

The light blocking ability (LBV) or opacity of a foamed, opacifying element, for example, a target light blocking value ($LBV_T$), in transmitted light, can be determined using a custom-built apparatus consisting of a fiber optic Metal Halide or Tungsten light source, a computer controlled translational stage and an optical photometer. In this procedure, the fiber optic light source was positioned 10 mm above the surface of the foamed, opacifying element. A photo detector was placed on the opposite side of the foamed, opacifying element directly across from the fiber optic light source, in order to quantify the amount of light that passed through the foamed, opacifying element. The light blocking value of each foamed, opacifying element was calculated by comparing the light intensity (I) that passed through the foamed, opacifying element to the light intensity ($I_0$) that reaches the photo detector from the fiber optic light source over the same distance when no foamed, opacifying element is present, and using the equation:

$-\log_{10}(I/I_0)$.

Each textile fabric substrate that can be used in the present invention has an inherent light blocking value ($LBV_S$). Such values can be determined by the same manner as described above for determined the $LBV_T$ of a foamed, opacifying element.

A dry opacifying layer obtained using the present invention can have a light blocking value that can be identified as $LBV_L$, and can be the calculated difference between a target light blocking value $LBV_T$ and $LBV_S$, or $LBV_{T-S}$.

Glass transition temperatures of the organic polymers used to prepare the continuous polymeric phase can be measured using Differential Scanning calorimetry (DSC) using known procedures. For many commercially available organic polymers, the glass transition temperatures are known from the suppliers.

Polymer viscosity (in centipoises) comprising the continuous polymeric phase can be measured in ethyl acetate at concentration of 20 weight % of the polymer at 25° C. in an Anton Parr MCR 301 stress rheometer in a coquette using steady shear sweeps. Shear rate at 100 $sec^{-1}$ was calculated from the resulting graphical plot of viscosity vs. shear rate.

CIELAB L*, a*, and b* values described herein have the known definitions according to CIE 1976 color space or later known versions of color space and were calculated assuming a standard D65 illuminant. The Y tristimulus value of the X, Y, and Z tristimulus values was used as a measure of the luminous reflectance or "brightness" of a dry opacifying layer.

Uses

The foamable aqueous compositions and foamed aqueous compositions described herein can be used to prepare foamed, opacifying elements that in turn can be useful as radiation (light and heat) blocking materials as for example, as blackout curtains, carpets, banners, and window shades for airplanes, labels, projection screens, textile fabrics, and packaging materials. The foamed, opacifying elements can also be designed to provide improved sound and heat blocking properties. The term "blackout curtain" is intended to include but not limited to, window curtains, shades for all purposes, draperies, room dividers, privacy curtains, and cubicle curtains suitable for various environments and structures. The foamed, opacifying elements prepared according to the present invention can exhibit blackout (light blocking) properties and can optionally have an opaque printable surface able to accept ink using in screen printing, inkjet printing, or other printing processes. Thus, one can provide opposing printable surfaces in such materials (elements) with the same light blocking capacity as if only one side was printed, with no printed image on one side showing through the other side.

Foamable Aqueous Compositions

The foamable aqueous compositions useful in the present invention can be suitably aerated to provide foamed aqueous compositions. The foamable aqueous compositions used in the present invention have five essential components, that is, only five components needed to obtain the properties of the foamed, opacifying element described herein, all of which are described below: (a) porous particles; (b) a binder material; (c) one or more additives comprising at least one surfactant; (d) water; and (e) an opacifying colorant different from all of the compounds of component (c), which opacifying colorant absorbs "predetermined electromagnetic radiation" (generally UV to near-IR, for example, absorbing the radiation of all wavelengths of from 350 nm to 800 nm or from 350 nm to and including 700 nm). Optional (non-essential) components that can be included are also described below.

The foamable aqueous composition used according to this invention generally has at least 35% and up to and including 70% solids, or more particularly at least 40% and up to and including 60% solids.

Porous Particles:

Porous particles used in the present invention containing discrete pores (or compartments) are used in each dry opacifying layer and they are generally prepared, as described below, using one or more water-in-oil emulsions in combination with an aqueous suspension process, such as in the Evaporative Limited Coalescence (ELC) process. The details for the preparation of the porous particles are provided, for example, in U.S. Pat. No. 8,110,628 (Nair et al.), U.S. Pat. No. 8,703,834 (Nair), U.S. Pat. No. 7,754,409 (Nair et al.), U.S. Pat. No. 7,887,984 (Nair et al.), U.S. Pat. No. 8,329,783 (Nair et al.), and U.S. Pat. No. 8,252,414 (Putnam et al.), the disclosures of all of which are incorporated herein by reference. Thus, the porous particles are generally polymeric and organic in nature (that is, the continuous polymeric phase is polymeric and organic in nature) and non-porous particles (having less than 5% porosity) are excluded. Inorganic particles can be present on the outer surface as noted below.

The (a) porous particles can be composed of a continuous polymeric phase derived from one or more organic polymers that are chosen so that the continuous polymeric phase has a glass transition temperature ($T_g$) of at least 25° C., or more typically of at least 25° C. and up to and including 180° C., as determined using Differential Scanning calorimetry.

For example, the continuous polymeric phase can comprise one or more organic polymers having the properties noted above, wherein generally at least 70 weight % and up to and including 100 weight % based on the total polymer weight in the continuous polymeric phase. In some embodiments, the continuous polymeric phase is composed of one or more cellulose polymers (or cellulosic polymers) that have a glass transition temperature of at least 80° C. and up to and including 180° C., and a viscosity of at least 80 centipoises and up to and including 500 centipoises at a shear rate of 100 $sec^{-1}$ in ethyl acetate at a concentration of 20 weight % at 25° C. Such cellulose polymers include but not limited to, cellulosic polymers derived from one or more of cellulose acetate, cellulose butyrate, cellulose acetate butyrate, and cellulose acetate propionate. Mixtures of these cellulose polymers can also be used if desired, and mixtures comprising a polymer derived from cellulose acetate butyrate as at least 80 weight % of the total of cellulose polymers (or of all polymers in the continuous polymeric phase) are particularly useful mixtures. Details about such polymers are provided, for example, in U.S. Pat. No. 9,963,569 (Nair et al.), the disclosure of which is incorporated herein by reference In other embodiments, the continuous polymeric phase can comprise one or more organic polymers such as polyesters, styrenic polymers (for example polystyrene and polychlorostyrene), mono-olefin polymers (for example, polymers formed from one or more of ethylene, propylene, butylene, and isoprene), vinyl ester polymers (for example, polymer formed from one or more of vinyl acetate, vinyl propionate, vinyl benzoate, and vinyl butyrate), polymers formed from one or more α-methylene aliphatic monocarboxylic acid esters (for example, polymers formed from one or more of methyl acrylate, ethyl acrylate, butyl acrylate, dodecyl acrylate, octyl acrylate, phenyl acrylate, methyl methacrylate, ethyl methacrylate, butyl methacrylate, and dodecyl methacrylate), vinyl ether polymers (such as polymers formed from one or more of vinyl methyl ether, vinyl ethyl ether, and vinyl butyl ether), and vinyl ketone polymers (for example, polymers formed from one or more of vinyl methyl ketone, vinyl hexyl ketone, and vinyl isopropenyl ketone). Other useful polymers include polyurethanes, urethane acrylic copolymers, epoxy resins, silicone resins, polyamide resins, and polyesters of aromatic or aliphatic polycarboxylic acids with one or more aliphatic diols, such as polyesters of isophthalic or terephthalic or fumaric acid with diols such as ethylene glycol, cyclohexane dimethanol, and bisphenol adducts of ethylene or propylene oxides. The polyesters can be saturated or unsaturated. Other useful polyesters include lactic acid polymers, glycolic acid polymers, caprolactone polymers, and hydroxybutyric acid polymers. Details of such useful polymers are provided, for example in U.S. Pat. No. 9,891,350 (Lofftus et al.) and U.S. Pat. No. 9,469,738 (Nair et al.), the disclosures of both of which are incorporated herein by reference.

The continuous polymeric phase of the (a) porous particles can also be derived from ethylenically unsaturated polymerizable monomers and polyfunctional reactive compounds as described for example in U.S. Pat. No. 8,703,834 (Nair et al.), the disclosure of which is incorporated herein by reference.

In general, the porous particles used in the present invention can have a mode particle size equal to or less than 50 μm, or of at least 2 μm and up to and including 50 μm, or typically of at least 3 μm and up to and including 30 μm or even up to and including 40 μm. Most useful porous particles can have a mode particle size of at least 3 μm and up to and including 20 μm. Mode particle size represents the most frequently occurring diameter for spherical particles and the most frequently occurring largest diameter for the non-spherical particles in a particle size distribution histogram.

Pore stabilizing materials such as hydrocolloids can be present within at least part of the volume of the discrete pores distributed throughout the continuous polymeric phase, which pore stabilizing materials are described in patents cited above. In some embodiments, the same pore stabilizing material is incorporated in essentially all of the discrete pores throughout the entire porous particles. In many embodiments, the pore stabilizing hydrocolloids are selected from the group consisting of carboxymethyl cellulose (CMC), a gelatin, a protein or protein derivative, polyvinyl alcohol and its derivatives, a hydrophilic synthetic polymer, and a water-soluble microgel.

It can be desired in some embodiments to provide additional stability of one or more discrete pores in the porous particles during their formation, by having one or more amphiphilic block copolymers disposed at the interface of the one or more discrete pores and the continuous polymeric phase. Such materials are "low HLB," meaning that they have an HLB (hydrophilic-lipophilic balance) value as it is calculated using known science, of 6 or less, or even 5 or less. The details of these amphiphilic polymers and their use in the preparation of the porous particles are provided in U.S. Pat. No. 9,029,431 (Nair et al.), the disclosure of which is incorporated herein by reference.

A particularly useful amphiphilic block copolymer useful in such embodiments comprises poly(ethyleneoxide) and poly(caprolactone) that can be represented as PEO-b-PCL. Amphiphilic block copolymers, graft copolymers and random graft copolymers containing similar components are also useful.

Such an amphiphilic block copolymer can be present in the porous particles in an amount of at least 1 weight % and up to and including 99.5 weight %, or at least 2 weight % and up to and including 50 weight %, based on total porous particle dry weight.

The porous particles used in this invention can be spherical or non-spherical depending upon the desired use. In a method used to prepare the porous particles, additives (shape control agents) can be incorporated into the first or second aqueous phases, or in the oil (organic) phase to modify the shape, aspect ratio, or morphology of the porous particles. The shape control agents can be added prior to or after forming the water-in-oil-in-water emulsion. In either case, the interface at the oil and second water phase is modified before organic solvent is removed, resulting in a reduction in sphericity of the porous particles. The porous particles used in the present invention can also comprise surface stabilizing agents, such as colloidal silica or various polymers, on the outer surface of each porous particle, in an amount of at least 0.1 weight %, based on the total dry weight of the porous particle.

The average size of the discrete pores (or individually isolated and closed voids or compartments) is described above.

The porous particles can be provided as powders, or as aqueous suspensions (including water or water with water-miscible organic solvents such as alcohols). Such powders and aqueous suspensions can also include surfactants or suspending agents to keep the porous particles suspended or when rewetting them in an aqueous medium. A useful surfactant for this purpose, for example is a $C_{12}$-$C_{14}$ secondary alcohol derivative of poly(ethylene oxide) that can be commercially available as TERGITOL® 15-S-7 (Dow Chemical Corporation). The other compositional features are described in the incorporated description of methods for preparing the porous particles.

The porous particles can be present in the foamable aqueous composition in an amount of at least 0.05 weight % and up to and including 15 weight %, or typically at least 0.5 weight % and up to and including 10 weight %, based on the total weight of the foamable aqueous composition (including water that is present), particularly when the porous particles have a mode size of at least 3 µm and up to and including 30 µm.

Advantageously, for the porous particles used in the present invention, the spacing between the light scattering discrete pores within the porous particles is controlled during the process of forming them and is not subject to subsequent formulation effects such as dependent scattering effects.

Optimal single dry opacifying layers designed according to the present invention comprise: porous particles containing a small amount of an opacifying colorant as described below to enhance the light blocking capacity of the porous particles (particularly transmitted light blocking capacity); a binder material to hold the porous particles in place; and surfactants and other additives including optionally one or more tinting colorants that can be in other porous particles or dispersed within the binder material. The foamed aqueous composition used to prepare the single dry opacifying layer comprises foam cells that surround the porous particles.

Upon drying the foamed aqueous composition, the large mismatch in refractive index between the discrete pores of the porous particles in the single dry opacifying layer and the polymer walls (continuous polymeric phase), and the dried foam cells, causes incident electromagnetic radiation passing through the single dry opacifying layer to be scattered by the multiplicity of interfaces and discrete pores. The back scattered electromagnetic radiation can again be scattered and returned in the direction of the incident electromagnetic radiation thus reducing the attenuation and contributing to the opacifying power and brightness or luminous reflectance of the dry opacifying layer. If a small amount of electromagnetic radiation absorbing opacifying colorant is present in the porous particles of the dry opacifying layer, for example either in the discrete pores or in the continuous polymer phase of the porous particles, the light blocking capacity of the single dry opacifying layer is increased. This is because the multiple scattering of electromagnetic radiation in the dry opacifying layer increases the path length of the electromagnetic radiation through the single dry opacifying layer, thereby increasing the chance that the electromagnetic radiation will encounter the opacifying colorant in the dry opacifying layer and be blocked or absorbed by it.

A single dry opacifying layer present according to the present invention comprises porous particles and a relatively low amount of an electromagnetic radiation absorbing opacifying colorant such as carbon black for creating electromagnetic radiation blocking coatings and the dry foam cells surrounded by the binder material. Multiple light scattering effects by and among the porous particles and the surrounding dry foam cells, increase the path of the radiation through the single dry opacifying layer. The likelihood of radiation encountering an opacifying colorant is increased by this greater path length.

Binder Materials:

The foamable and foamed aqueous compositions used in the present invention also comprise one or more binder materials (that can behave as a "matrix" for all of the materials in the compositions and resulting single dry opacifying layer) to hold the essential porous particles, additives, opacifying colorants, and any optional materials together upon application to the textile fabric substrate and drying to form a single dry opacifying layer.

It is particularly useful that the binder material have the following properties: (a) it is water-soluble or water-dispersible; (b) it is capable of forming a stable foamed aqueous composition with the essential and optional components described herein; (c) it is capable of being disposed onto a suitable textile fabric substrate as described below; (d) it does not inhibit the aeration (foaming) process (described below); (e) it is capable of being dried and where desired also crosslinked (or cured); (f) it has good light and heat stability; (g) it is film-forming but contributes to the flexibility of the foamed, opacifying element and is thus not too brittle, for example having a $T_g$ of less than 25° C.

The choice of binder material can also be used to increase the laundering properties of the resulting foamed opacifying compositions in the foamed, opacifying elements. In addition, the binder material can be used to provide a supple feel to touch and flexibility especially when disposed on a textile fabric substrate that is meant for window coverings such as draperies. The binder material is useful in the foamed, opacifying element for binding together and adhering the porous particles and other materials in the dry foamed composition onto the textile fabric substrate.

The binder material can include one or more organic polymers that are film forming and that can be provided as an emulsion, dispersion, or an aqueous solution, and that cumulatively provide the properties noted above. It can also include polymers that are self-crosslinking or self-curable, or it can include one or more polymers to which crosslinking agents are added and are thus curable or capable of being crosslinked (or cured) under appropriate conditions.

Thus, if the binder material is crosslinkable (or curable) in the presence of a suitable crosslinking agent, such crosslinking (or curing) can be activated chemically with heat, radiation, or other known means. A curing or crosslinking agent serves to provide improved insolubility of the resulting dry foamed composition, cohesive strength, and adhesion to the textile fabric substrate. The curing or crosslinking agent is generally a chemical having functional groups capable of reacting with reactive sites in a binder material (such as a functionalized latex polymer) under curing conditions to thereby produce a crosslinked structure. Representative crosslinking agents include but are not limited to, multi-functional aziridines, aldehydes, methylol derivatives, and epoxides.

Useful binder materials include but are not limited, to poly(vinyl alcohol), poly(vinyl pyrrolidone), ethylene oxide polymers, polyurethanes, urethane-acrylic copolymers, other acrylic polymers, styrene-acrylic copolymers, vinyl polymers, styrene-butadiene copolymers, acrylonitrile copolymers, polyesters, silicone polymers, or a combination of two or more of these organic polymers. Such binder materials are readily available from various commercial sources or can be prepared using known starting materials and synthetic conditions. The binder material can be anionic, cationic or nonionic in net charge. A useful class of film-forming binder materials includes aqueous latex polymer dispersions such as acrylic latexes that can be ionic or nonionic colloidal dispersions of acrylate polymers and copolymers. For example, useful film-forming aqueous latexes include but are not limited to, styrene-butadiene latexes, poly(vinyl chloride) and poly(vinylidene chloride) latexes, poly(vinyl pyridine) latexes, poly(acrylonitrile) latexes, and latexes formed from N-methylol acrylamide, butyl acrylate, and ethyl acrylate. Examples of suitable commercially available binder materials include those sold by DSM under the trade names NEOREZ® A-1150, NEOCRYL® A-6093, by Dow under the trade name RHOPLEX® NW-1845K and by BASF under the tradenames BUTOFAN® N S144, and BUTOFAN® NS 222, by Lubrizol under the tradenames HYSTRETCH® and HYCAR®, and resins sold by Royal Adhesives such as PARANOL® AC-2032.

The binder material generally has a glass transition temperature that is less than 25° C., more likely equal to or less than 0° C., and even less than −10° C. Glass transition temperature can be determined using known procedures and such values are already known for many of the polymers useful as binder materials in this invention. The binder material desirably has adequate flexibility and tensile strength in order to maintain integrity upon handling, especially for use with textile fabric substrates.

The one or more binder materials can be present in the foamable aqueous composition in an amount of at least 20 weight %, or at least 20 weight % and up to and including 60 weight %, or typically at least 30 weight % and up to and including 50 weight %, based on the total foamable aqueous composition (that is, the total weight of all components including water).

Additives:

The foamable aqueous compositions can include at least 0.0001, or at least 0.001 weight %, or even at least 0.01 weight %, and up to and including 2 weight %, or up to and including 5 weight %, or even up to and including 20 weight %, or even at least and including 30 weight %, of one or more additives comprising at least one surfactant as defined below. Other useful additives include but are not limited to plasticizers, inorganic or organic pigments and dyes (for example, pigment or dye colorants different from the opacifying colorants described below), flame retardants, biocides, fungicides, antimicrobial agents, preservatives, pH buffers, optical brighteners, tinting colorants, metal particles such as metal platelets or metal flakes, thickeners, and inorganic fillers (such as clays) that are not any of the other additive materials or opacifying colorants described below. These amounts refer to the total of all of the one or more additives in a given foamable aqueous composition and are based on the total weight of those compositions (including water). There can be mixtures of each type of additive, or mixtures of two or more types of additives in each of these compositions.

Any of these additives or mixtures thereof, can be present within any location of the foamed aqueous composition, including but not limited to: the continuous polymeric phase; a volume of the first set (or other set) of discrete pores; or both the first set (or other set) of discrete pores and the continuous polymeric phase of the porous particles. Alternatively, the one or more additives can be present within the binder material alone, or both within the binder material and within the porous particles.

In all embodiments, the (c) one or more additives useful in the present invention are not the same compounds as the (a) porous particles, (b) binder materials, and (e) opacifying colorants as described herein.

As noted above, at least one additive is a surfactant that is defined as a compound that reduces surface tension in a composition. In most embodiments, this essential surfactant is a foaming agent that functions to create and enhance foam formation. In many such embodiments, the one or more (c) additives comprise one or more foaming agents (surfactants) as well as one or more foam stabilizing agents that are also surface-active agents that function to structure and stabilize the foam. Examples of useful foaming agents (surfactants) and foam stabilizing dispersing agents include but are not limited to, ammonium stearate, sodium lauryl sulfate, ammonium lauryl sulfate, ammonium sulfosuccinate, disodium stearyl sulfosuccinate, ethoxylated alcohols, ionic, nonionic or anionic agents such as fatty acid soaps or a fatty acid condensation product with an alkylene oxide, for example, the condensation product of ethylene oxide with lauryl or oleic acid or an ester of fatty alcohols and similar materials, many of which can be obtained from various commercial sources. Mixtures of foaming agents can be used if desired.

The relative amounts of each of these two types of (c) one or more additives is not critical as long as the desired function is evident, that is suitable foaming properties as required to prepare a foamed aqueous composition according to the present invention, and stability of that foamed aqueous composition during storage and manufacture of the foamed, opacifying elements. The optimal amounts of each of these additives can be determined by using routine experimentation and the teaching provided herein.

Other useful (c) one or more additives include metal particles that can be obtained from any available commercial source as metal flakes or metal platelets and in dry form or as a suspension. Such metal flakes or metal platelets are substantially 2-dimensional particles, having opposing surfaces or faces separated by a relatively minor thickness dimension. The metal flakes can have a size range of at least 2 μm and up to and including 50 μm in main surface equivalent circular diameter (ECD) wherein the ECD is the diameter of a circle having the same area as the main face. Examples of useable metal flakes include those available from Ciba Specialty Chemicals (BASF) such as aluminum flakes that are available as METASHEEN 91-0410 in ethyl acetate, and copper flakes that can be obtained from various commercial sources. Further details of useful metal flakes are provided in Cols. 11-12 of U.S. Pat. No. 8,614,039 (Nair et al.), the disclosure of which is incorporated herein by reference. The metal particles described above, and particularly the metal flakes can be in the foamable aqueous composition in any suitable location, but they are particularly useful when incorporated within the porous particles such as within the volume of the discrete pores of the porous particles.

Useful biocides (that is, antimicrobial agents or antifungal agents) that can be present as (c) one or more additives include but are not limited to, silver metal (for example, silver particles, platelets, or fibrous strands) and silver-containing compounds such as silver chelates and silver salts such as silver sulfate, silver nitrate, silver chloride, silver bromide, silver iodide, silver iodate, silver bromate, silver tungstate, silver phosphate, and silver carboxylates. In addition, copper metal (for example, copper particles, platelets, or fibrous strands) and copper-containing compounds such as copper chelates, and copper salts can be present as (c) one or more additives for biocidal purposes. Mixtures of any of silver metal, silver-containing compounds, copper metal, and copper-containing compounds, can also be present and used in this manner.

It can also be useful to include thickeners as (c) one or more additives in order to modify the viscosity of the foamable aqueous composition and to stabilize it as long as aeration is not inhibited. A skilled worker can optimize the viscosity so as to obtain optimal aeration conditions and desired foam density as described below. Useful thickeners can be utilized to control the rheology of the foamable aqueous composition depending upon the method used to form the dry opacifying layer on a textile fabric substrate as described below. Particularly useful rheology modifiers are non-associative thickeners such as ACRYSOL® G111 (Dow Chemical Company).

Particularly useful (c) one or more additives comprise one or more tinting colorants that can be used to provide a specific observable color, coloration, or hue in the resulting foamed, opacifying elements. These materials are not chosen to provide the opacifying property described below for the opacifying colorants and thus, tinting colorants are intended to be different materials than the opacifying colorants.

Mixtures of tinting colorants can be present in the foamable aqueous compositions and they can be different in composition and amount from each other. The desired coloration or hue can be obtained using specific tinting colorants can be used in combination with opacifying colorant(s) described below to offset or modify the original color of a foamed, opacifying element (without such materials) to provide more whiteness (or brightness) in the final "color" (or coloration). The one or more tinting colorants can be incorporated within the porous particles (either within the volume of discrete pores, within the continuous polymeric phase, or in both places) or they can be uniformly dispersed within the binder material. In some embodiments, a tinting colorant can be incorporated within the same porous particles that also include an opacifying colorant (as described below). Alternatively, one or more tinting colorants can be present within both the porous particles (in a suitable location) and within the binder material.

In some embodiments, a first population of porous particles described herein comprising opacifying colorants as described below, and another population of porous particles described herein comprising tinting colorants can be mixed with the first population of porous particles. The two sets of porous particles can comprise the same or different polymers in the continuous polymeric phase.

The one or more tinting colorants can be present in the foamable aqueous composition in an amount of at least 0.0001 weight %, or more typically at least 0.001 weight %, and up to and including 3 weight %, based on the total weight of the foamable aqueous composition (including water). Tinting colorants can be dyes or organic pigments that are soluble or dispersible in organic solvents and polymers that are used for making the porous particles and thus can be included within the oil phase used to prepare such porous particles. Alternatively, the tinting colorants can be primarily water-soluble or water-dispersible materials and included into an aqueous phase used to prepare the porous particles or in the foamable aqueous composition as an additive.

It can also be useful to include one or more optical brighteners as (c) one or more additives to increase the whiteness (brightness or "fluorescent" effect) of the final coloration in the foamed, opacifying element. Optical brighteners are sometimes known in the art as "fluorescent whiteners" or "fluorescent brighteners." In general, such materials are organic compounds selected from classes of known compounds such as derivatives of stilbene and 4,4'-diaminostilbene (such as bistriazinyl derivative); derivatives of benzene and biphenyl (such as styril derivatives); pyrazolines; derivatives of bis(benzoxazole-2-yl); coumarins; carbostyrils; naphthylamides; s-triazines; and pyridotriazoles. Specific examples of optical brighteners can be found in various publications including "Fluorescent Whitening Agents," Kirk-Othmer *Encyclopedia of Chemical Technology, Fourth Edition*, volume 11, Wiley & Sons, 1994. One of more of such compounds can be present in an amount of at least 0.01 weight % and up to and including 2 weight %, all based on the total weight of the foamable aqueous composition.

When present, one or more optical brighteners can be in one or more locations in the foamed aqueous composition. For example, an optical brightener can be present in the binder material. Alternatively, an optical brightener can be present within: the continuous polymeric phase of the porous particles; a volume of the first set (or any other set) of discrete pores in the porous particles; or both in a volume of the first set (or any other set) of discrete pores and the continuous polymeric phase, of the porous particles.

In many useful embodiments, the (c) one or more additives comprise two or more materials selected from surfactant that is a foaming agent, a foam stabilizing agent, a tinting agent, an optical brightener, flame retardants, an antimicrobial agent, and an inorganic filler (such as a clay).

Water:

(d) Water is the primary solvent used in the foamable aqueous compositions used according to the present invention. By "primary" is meant that of the total weight of solvents, water comprises at least 75 weight %, and more likely at least 80 weight % and up to and including 100 weight % of the total solvent weight. Auxiliary solvents that can be present must not adversely affect or harm the other components in the composition, namely the (a) porous particles, (b) binder materials, (c) one or more additives, and (e) opacifying agents. Nor must such auxiliary solvents adversely affect formation of the foamable aqueous composition or its use to prepare a foamed, opacifying element. Such auxiliary solvents can be water-miscible organic solvents such as alcohols and ketones.

The solvents then, primarily water, comprise at least 30 weight % and up to and including 65 weight %, or typically at least 40 weight % and up to and including 60 weight %, of the total weight of the foamable aqueous composition.

Opacifying Colorants:

The (e) opacifying colorants used in the present invention can be a single colorant or chosen from any suitable combination of colorants such that the single or multiple colorants form the "opacifying colorant" that absorbs predetermined electromagnetic radiation (defined above) to provide blackout properties (or suitable opacity). Opacifying colorants can be soluble dyes or pigments or combinations of each or both types of materials. The opacifying colorants are different from all of the compounds defined above as the (c) one or more additives.

In most embodiments, the one or more (e) opacifying colorants are present within a volume of the first set (or another set) of discrete pores within the porous particles, within the continuous polymeric binder of the porous particles, or within both the volume of the first set (or another set) of discrete pores and the continuous polymeric binder of the porous particles. This is highly advantageous as the porous particles can be used to "encapsulate" various opacifying colorants as well as tinting colorants and other (c) one or more additives so they are kept isolated from the other components of the foamable aqueous composition and are additionally not exposed to the environment during sewing or upon surface damage of the foamed, opacifying element. However, in some embodiments, it can be useful to incorporate opacifying agents solely or additionally within the (b) binder material in which the (a) porous particles are dispersed.

As used herein, an "opacifying colorant" includes one or more colorant materials that are chosen, individually or in combination, to provide the blocking of predetermined electromagnetic radiation (as described above). While the opacifying colorants can provide some coloration or desired hue, they are not purposely chosen for the purpose and are thus materials that are chosen to be different from the tinting colorants described above.

Examples of (e) opacifying colorants that can be used individually or in combination include but are not limited to, neutral or black pigments or dyes, a carbon black, black iron oxide, graphite, aniline black, anthraquinone black, and combinations of colored pigments or dyes such as combinations of two or more cyan, magenta, green, orange, blue, red, and violet dyes. The present invention is not limited to only the specific opacifying colorants described herein but these are considered as representative and as suitable guidance for a skilled worker to devise other combinations of opacifying colorants for the desired absorption in the predetermined electromagnetic radiation. A carbon black or a neutral or black pigment or dye (or combination thereof) is particularly useful as an opacifying colorant, of which there are many types available from commercial sources. Combinations of dyes or pigments such as a combination of the subtractive primary colored pigments (cyan, magenta, and yellow colored pigments) can also be used to provide a "black" or visually neutral opacifying colorant.

The (e) opacifying colorant can be generally present in the foamable aqueous composition in an amount of at least 0.001 weight % and up to and including 0.5 weight %, or even at least 0.003 weight % and up to and including 0.2 weight %, all based on the total weight of the foamable aqueous composition (including the weight of solvent). These amounts refer to the total amount of one or a mixture of opacifying colorants. For example, as noted above, an (e) opacifying colorant can comprise a combination of two or more component colorants (such as a combination of dyes or a combination of pigments) designed in hues and amounts so that the combination meets the desired properties described herein.

In particular embodiments, the (e) opacifying colorant is a carbon black that is present in an amount of at least 0.003 weight % and up to and including 0.2 weight %, based on the total weight of the foamable aqueous composition.

In some embodiments, the (e) opacifying colorants, if in pigment form, are generally milled to a fine particle size and then encapsulated within the volume of the discrete pores of the (a) porous particles by incorporating the milled pigment within an aqueous phase used in making the porous particles. Alternatively, the (e) opacifying colorant can be incorporated within the continuous polymeric phase of the (a) porous particles by incorporating the opacifying colorant in the oil phase used in making the (a) porous particles. Such arrangements can be achieved during the manufacture of the (a) porous particles using the teaching provided herein and teaching provided in references cited herein.

In some embodiments, it can be useful to incorporate or dispose at least 95% (by weight) of the total (e) opacifying colorant (or combination of component colorants) within the (a) porous particles (either in the volume of the discrete pores, continuous polymeric phase, or both), and to incorporate the remainder, if any, within the (b) binder material. However, in many embodiments, 100 weight % of the (e) opacifying colorant is incorporated within the (a) porous particles. For example, more than 50 weight % of the total opacifying colorant can be disposed or incorporated within the continuous polymeric phase of the (a) porous particles, and the remainder can be incorporated within the volume of the discrete pores.

The (e) opacifying colorants useful in the practice of this invention can be incorporated into the volume of the discrete pores of individual (a) porous particles for example, by incorporating them in a first water phase to form a water-in-oil emulsion or in the continuous polymeric phase of the discrete (a) porous particles by incorporating them in the oil phase. In a particular embodiment, an (e) opacifying colorant can be incorporated into the first aqueous phase in the form of a milled solid particle dispersions of the opacifying colorant. Preparation of milled solid particle dispersions can include combining the opacifying colorant particles to be reduced in size with a dispersant and a liquid medium such as water or ethyl acetate (when the opacifying colorant is incorporated in the continuous polymeric phase of the particle) in which the porous particles are to be dispersed, in a suitable grinding mill in which the porous particles are reduced in size and dispersed. The dispersant, an important ingredient in the milling, can be chosen to allow the opacifying colorant particles to be milled in the liquid medium down to a size small enough for incorporation into the discrete pores of the (a) porous particles. The dispersants can be selected to obtain efficient opacifying colorant particle size reduction during milling, provide good colloidal stability of the opacifying colorant particles to prevent agglomeration after milling and impart the desired properties of the final foamed aqueous composition containing the opacifying colorants and the (a) porous particles containing them. Alternatively, the (e) opacifying colorant also can be incorporated in the continuous polymeric phase as a master batch of the (e) opacifying colorant and an appropriate resin.

Foamed Aqueous Compositions

Foamed aqueous compositions can be prepared using the procedures described below wherein an inert gas (such as air) is mechanically incorporated into the foamable aqueous composition as described above, which procedures are designed to provide a foam density of at least 0.1 g/cm² and up to and including 0.5 g/cm³, or more likely of at least 0.1 g/cm³ and up to and including 0.4 g/cm³. Foam density can be determined gravimetrically by weighing a known volume of the foamed aqueous composition.

The foamed aqueous composition according to this invention generally has at least 35% solids and up to and including 70% solids, or more particularly at least 40% solids and up to and including 60% solids.

The five essential components (a) through (e) of the foamed aqueous composition are generally present in the same amounts as essential components in the foamable aqueous composition (described above) as the foaming process does not appreciably add to or diminish the amounts of such components.

For example, the (a) porous particles (as described above) can be present in the foamed aqueous composition in an amount of at least 0.05 weight % and up to and including 15 weight %, or typically of at least 0.5 weight % and up to and including 10 weight %, based on the total weight of the foamed aqueous composition.

One or more (b) binder materials (as described above) can be present in an amount of at least 20 weight %, or at least 25 weight % and up to and including 70 weight % or typically of at least 30 weight % and up to and including 50 weight %, based on the total weight of the foamed aqueous composition. In addition, one or more of the binder materials in the foamed aqueous composition can be curable.

(c) One or more additives (as described above) can be present in an amount of at least 0.0001 weight % and up to and including 30 weight % or typically of at least 0.001 weight %, or even at least 0.01 weight %, and up to and including 20 weight %, based on the total weight of the foamed aqueous composition. At least one of the (c) one or more additives is a surfactant as described above, and in particularly useful embodiments, the (c) one or more additives comprise a foaming agent and a foam stabilizing agent. Other useful (c) one or more additives can be present as noted above for the foamable aqueous compositions, also in the amounts noted above. For example, some particularly useful embodiments of the foamed aqueous composition, the (c) one or more additives comprise two or more materials selected from surfactant that is a foaming agent, a surfactant that is a foam dispersing agent, a tinting agent, an optical brightener, a flame retardant, an antimicrobial agent, and an inorganic filler (such as a clay).

As noted above, (d) water is also present as the predominant solvent (at least 75 weight % of total solvent weight), and all of the solvents that are present in an amount of at least 30 weight % and up to and including 70 weight %, or typically at least 40 weight % and up to and including 60 weight %, based on the total weight of the foamed aqueous composition.

The (e) opacifying colorants (as described above) are generally present in any suitable amount to provide the desired appearance, coloration, and opacity in the resulting foamed (and dried) opacifying element, In many embodiments, the one or more (e) opacifying colorants can be present in an amount of at least 0.001 weight % or at least 0.001 weight % and up to and including 0.5 weight %, or even in an amount of least 0.003 weight % and up to and including 0.2 weight %, especially when the (e) opacifying colorant is a carbon black, all weights based on the total weight of the foamed aqueous composition.

In some embodiments, the foamed aqueous composition comprises at least 0.5 weight % and up to and including 10 weight % of the (a) porous particles (as described above) that have a mode particle size of at least 3 μm and up to and including 30 μm, the amount based on the total weight of the foamed aqueous composition. In addition, discrete pores in such (a) porous particles can have an average pore size of at least 100 nm and up to and including 7000 nm.

Moreover, the foamed aqueous composition can further comprise at least 0.001 weight % of the (e) opacifying colorant (described above) within the porous particles. For example, some opacifying colorant can be a carbon black and present in an amount of at least 0.003 weight % and up to and including 0.2 weight % based on the total weight of the foamed aqueous composition.

Such (e) opacifying colorant can be within: (i) the continuous polymeric phase of the (a) porous particles; (ii) a volume of the first set (or additional set) of discrete pores; or (iii) both the volume of the first set (or additional set) of discrete pores and the continuous polymeric phase of the (a) porous particles.

In some embodiments of the foamed aqueous composition, (a) porous particles can be used that further comprise at least a second set of discrete pores (different from a "first" set of discrete pores) and an (e) opacifying colorant or a tinting colorant can be present within: the continuous polymeric phase, the volume of the second set of discrete pores, or in both the continuous polymeric phase and the volume of the second set of discrete pores. First and second sets (or additional sets) of discrete pores can be incorporated into the (a) porous particles using manufacturing technology described in several references cited above, including U.S. Pat. No. 8,110,628 (Nair et al.).

Foamed, Opacifying Elements

Foamed, opacifying elements can be prepared using methods and systems as described below according to the present invention. Such articles comprise a textile fabric substrate and a single dry foamed composition disposed generally on only one supporting side of that textile fabric substrate to form a single dry opacifying layer. As described in more detail, each textile fabric substrate has two supporting (planar) sides, that is, a first supporting side and a second opposing supporting side. The fabric textile substrate can have a light blocking value ($LBV_S$) that is determined as described above.

Each dry foamed composition is derived from a foamed aqueous composition described above according to the present invention. In all embodiments, each dry foamed composition comprises at least the following five essential components (a) through (e) and amounts, all of which are described in more detail above. However, the (d) water (and any other solvents) can be absent or present in very low amounts.

Component (a) porous particles are present in an amount of at least 0.1 weight % and up to and including 40 weight % or at least 0.5 weight % and up to and including 10 weight % of (a) porous particles that are described in detail above, the amounts based on the total weight of the dry foamed composition, particularly when the (a) porous particles have a mode particle size of at least 2 μm and up to and including 50 μm (or at least 3 μm and up to and including 30 μm) and the first set of discrete pores of the (a) porous particles have an average pore size of at least 100 nm and up to and including 7,000 nm.

In addition, the dry foamed composition includes component (b) binder material in an at least partially cured or crosslinkable form, which is at least 10 weight % and up to and including 70 weight %, or at least 20 weight % and up to and including 60 weight % of one or more at least partially cured binder materials. Such at least partially cured binder materials are derived by at least partial curing or crosslinking (described below) of the (b) binder materials described above. The noted amounts are based on the total weight of the dry foamed composition. Each of the one or more (b) binder materials has a $T_g$ of 25° C. or less, or 0° C. or less, or even −10° C. or less.

The (c) one or more additives, at least one is a surfactant, are present in an amount of at least 0.2 weight % and up to and including 50 weight %, or at least 1 weight % and up to and including 45 weight %, such additives being selected from the group consisting of foaming agents, foam stabilizing agents, plasticizers, inorganic or organic pigments and dyes (for example, pigment or dye colorants different from the opacifying colorants described below), flame retardants, antimicrobials, fungicides, preservatives, pH buffers, optical brighteners, tinting colorants, metal particles such as metal platelets or metal flakes, thickeners, and inorganic fillers (such as clays) that are not any of the other additive materials or opacifying colorants described herein, all of which additives are described in more detail above. The amounts are based on the total weight of the dry foamed composition. As noted above, most embodiments include at least one surfactant that is a foaming agent and at least one foam stabilizing agent.

Particularly useful (c) one or more additives comprise two or more materials selected from a foaming agent, a foam stabilizing agent, a tinting colorant, an optical brightener, a flame retardant, an antimicrobial agent, and an inorganic filler (such as a clay).

Thus, the foamed, opacifying element can comprise one or more tinting colorants as (c) one or more additives in the dry foamed composition in an amount of at least 0.0001 weight % and up to and including 3 weight %, based on the total weight of the dry foamed composition. Such tinting colorant(s) can be present in at least the (a) porous particles and can be elsewhere also.

It is also useful to include one or more optical brighteners as (c) one or more additives in an amount of at least 0.001 weight % and up to and including 0.4 weight %, based on the total weight of the dry foamed composition.

The dry foamed composition is "substantially" dry in nature, meaning that it comprises less than 5 weight %, or even less than 2 weight %, of aqueous medium (including water and any other solvents), based on the total weight of the dry foamed composition. This amount may not include any water that can be present in the discrete pores of the (a) porous particles. The dry foamed composition in the dry opacifying layer generally comprises at least 90% solids, or at least 95% solids, or even at least 98% solids.

The dry foamed composition can also contain at least 0.002 weight %, or even at least 0.02 weight % and up to and including 2 weight % or up to and including 1 weight %, of one or more (e) opacifying colorants (as described above), which opacifying colorants absorb all wavelengths of the predetermined electromagnetic radiation (as defined above). Details of such (e) opacifying colorants are described above, and the amounts are based on the total weight of the dry foamed composition. Such (e) opacifying colorants can be present within the (a) porous particles or within the (b) binder material, or within both (a) and (b) components.

In some embodiments, a carbon black is present as the (e) opacifying colorant in an amount of at least 0.002 weight % and up to and including 1 weight %, based on the total weight of the dry foamed composition.

In many embodiments of the foamed, opacifying element, the (e) opacifying colorant (such as a carbon black) can be present within: the continuous polymeric phase of the (a) porous particles; a volume of the first set (or additional set) of discrete pores; or both the volume of the first set (or additional set) of discrete pores and the continuous polymeric phase of the (a) porous particles.

In addition, such single dry opacifying layers exhibit a luminous reflectance (opacity) that is greater than 40%, as measured for the Y tristimulus value. For this purpose, luminous reflectance (brightness) is determined as described above.

Dry textile fabric substrates useful in the practice of the present invention can comprise various materials such as woven and nonwoven textile fabrics composed of nylon, polyester, cotton, aramide, rayon, polyolefin, acrylic, wool, fiberglass fabrics, or felt or mixtures thereof. The textile fabric substrates can vary in dry thickness as long as they are suitable for the desired foamed, opacifying element. In most embodiments, the dry textile fabric substrate thickness is at least 50 μm but this can be varied according to the present invention for various economic or aesthetic purposes as described herein. Materials that are specifically excluded from the term "textile fabric substrate" include any nonporous continuous phase substrates such as polyester films that provides a non-porous surface and paper-based substrates both with and without resin coating.

Particularly useful textile fabric substrates comprise a textile fabric web (such as a flexible textile fabric web).

The textile fabric substrates can be surface treated by various processes including corona discharge, glow discharge, UV or ozone exposure, flame, or solvent washing in order to promote desired physical properties.

The light blocking value of the textile fabric substrate ($LBV_S$) can be determined as described above and is generally at least 0.1 and up to and including 5.0 or at least 0.3 and up to and including 4.5.

Generally, the foamed opacifying elements prepared by the present invention are designed with a single dry opacifying layer disposed on one supporting (planar) side of the textile fabric substrate as described above using techniques described below, and the single dry opacifying layer is the only (outermost) layer disposed thereon.

Attractive finishes can be imparted to the foamed, opacifying element by for example, flocking the foamed aqueous composition that is disposed on the textile fabric substrate. Flock or very short (0.2 mm and up to several mm) fibers can be disposed in the single dry opacifying layer using either by electrostatic or mechanical techniques on the outermost surface of the foamed aqueous composition before drying.

The backside of the foamed, opacifying element can be modified with embossing or printing as noted above to modify the second opposing supporting side of the textile fabric substrate, using known procedures.

Method of Making Foamed, Opacifying Elements

The present invention can be used to provide a foamed, opacifying element having a target (or desired or predetermined) light blocking value ($LBV_T$) of at least 3 and even at least 4, which foamed, opacifying element comprises or includes a specific textile fabric substrate having a first supporting side and an opposing second supporting side. This textile fabric substrate can be provided, for example, by a customer, supplier, or vendor, or it can be prepared in manufacturing for immediate or future use. In many instances, a customer may choose or provide the textile fabric substrate having a known $LBV_T$, and then the present invention can be used to advantage to design and manufacture the desired foamed, opacifying element with such specifications in a most efficient manner. Thus, a customer or manufacturer can choose suitable specifications and thereby provide options for custom-design of foamed, opacifying elements having various specifications and then sell such materials to commercial and retail businesses to meet individual needs.

Each textile fabric substrate has an inherent light blocking value ($LBV_S$) of at least 0.1 and up to and including 5.0, due to its type of weave, the tightness of its weave, its color, its pattern, its dry thickness, and porosity in general. In many instances, this $LBV_S$ is unknown for each textile fabric substrate. In other instances, the $LBV_S$ can be determined for example, using the procedure described above.

Once a textile fabric substrate is provided and its $LBV_S$ is determined, one can calculate $LBV_{T-S}$ that is the difference between $LBV_T$ and $LBV_S$, which value then tells the user of the present invention how a foamable aqueous composition and the desired dry coating weight can be chosen to provide a single dry opacifying layer that will essentially match $LBV_{T-S}$, that is, ±15% between calculated $LBV_T$ and actual $LBV_T$.

Another factor that is not obvious but plays a role in impacting the actual $LBV_T$ that will be obtained is the manufacturing or coating and drying configuration as described earlier, including crushing or densifying conditions.

Such foamable aqueous composition can be chosen using trial and error based on past experience, but it can also be chosen based on certain types of properties it may have, for example, coloration, opacity, reflectance, and chemical properties such as fire retardation and desired antimicrobial effects.

It is also important to note, that once a foamable aqueous composition is chosen, it can be important for achieving a desired $LBV_T$ with a given textile fabric substrate to determine an optimal foam density for the corresponding foamed aqueous composition. This optimal foam density can be readily determined by routine experimentation in the foaming procedure (described below) whereby the foaming conditions are varied until the desired foam density is identified.

Moreover, it is important to determine the coating configuration while the foamed aqueous composition is applied to the textile fabric substrate and drying afterwards. The textile fabric substrate can be stretched only the coating direction while the foamed aqueous composition is being coated on it in a roll to roll configuration, the textile fabric substrate can be biaxially stretched on a tenter frame as the foamed aqueous composition is coated on it, or the foamed aqueous composition can be done off pins after which the textile fabric substrate is tentered during drying. All of this can impact the interaction of the foamable aqueous composition with the textile fabric substrate and the final $LBV_T$.

Once a foamable aqueous composition and coating method are chosen, one can use a mathematical formula to determine a dry coating weight of a single dry opacifying layer derived from the chosen foamable aqueous composition that will provide the desired $LBV_{T-S}$ for the single dry opacifying layer. This empirical mathematical formula can be obtained from a look-up table ("LUT") that is created by first coating, drying, and crushing several dry coating weights of the chosen foamable aqueous composition (after foaming) and using a chosen coating configuration on the textile fabric substrate having a known $LBV_S$. The actual dry coating weight and resulting light blocking value of each foamed, opacifying element ($LBV_T$) is then measured. The dry coating weights are then plotted versus $LBV_{T-S}$ and the best fit equation is determined using regression analysis. The $LBV_{T-S}$ is dependent upon various factors relating to the specific composition of the foamable aqueous composition that is chosen, the coating configuration as well as the intended dry coating weight of the resulting single dry opacifying layer. Further, the outcome of the regression analysis provides an estimate or prediction of desired dry coating weights from the $LBV_{T-S}$ values. The LUT thus created for the prediction of dry coating weight from the $LBV_{T-S}$ had an average prediction error of less than 15%.

As used herein, unless otherwise indicated, the terms "dry coating weight" and "coating weight" are meant to be interchangeable. Thus, the dry coating weight (or coating weight) in reference to the dry opacifying layer is defined in terms of $g/m^2$ (or ounces/$yd^2$) and is intended to refer only to the dry applied weight (or % solids) in the single dry opacifying layer. Such dry coating weights will generally be at least 40 $g/m^2$, or at least 60 $g/m^2$, or even at least 80 $g/m^2$, and up to and including 250 $g/m^2$, or even at least 90 $g/m^2$ and up to and including 300 $g/m^2$.

In some instances, a user of the present invention will have access to a set of multiple (two or more) foamable aqueous compositions (each of which can be converted by foaming into multiple corresponding foamed aqueous compositions). A unique mathematical formula can be determined for each foamable aqueous composition in the set. Thus, a set of mathematical formulae (for example, in the form of a LUT) associated with the set of foamable aqueous compositions can be determined and used as needed. The LUT then relates dry coating weights of the respective foamable aqueous compositions to respective light blocking values for the respective resulting dry opacifying layers. Once the necessary dry coating weight is identified for the textile fabric substrate and the chosen $LBV_T$ and foamable aqueous composition, the chosen foamable aqueous composition is applied (after foaming) having the desired percent solids using suitable coating equipment and means described below, to form a single dry opacifying layer as the only layer disposed on the first supporting side of the textile fabric substrate, such that the resulting single dry opacifying layer has a light blocking value that is equal to $LBV_{T-S}$, ±15%, or more particularly, equal to $LBV_{T-S}$, ±10%.

Specifically, once a necessary dry coating weight is determined, a chosen foamable aqueous composition as described above comprising the five essential components (a) through (e) in the described amounts can be used to provide a single dry opacifying layer in the following manner.

The chosen foamable aqueous composition is aerated to provide a corresponding foamed aqueous composition having a foam density of at least 0.1 $g/cm^3$ and up to and including 0.4 $g/cm^3$, or of at least 0.15 $g/cm^3$ and up to and including 0.4 $g/cm^3$. This aeration procedure can be carried out using any suitable conditions and equipment that would be readily apparent to one skilled in the art in order to create a "foam" in the presence of a foaming agent as a (c) one or more additive surfactant described above. For example, aeration can be carried out by mechanically introducing air or an inert gas (such as nitrogen or argon) in a controlled manner. High shear mechanical aeration can be carried out using sonication or high-speed mixers, such as those equipped with a cowles blade, or with commercially available rotorstator mixers with interdigitated pins such as an Oakes mixer or a Hobart mixer, by introducing air under pressure or by drawing atmospheric air into the foamable aqueous composition by the whipping action of the mixer. Suitable foaming equipment can be used in a manner to provide the desired foam density with modest experimentation. It can be useful to chill or cool the chosen foamable aqueous composition below ambient temperature to increase its stability by increasing its viscosity, and to prevent its collapse. This chilling operation can be carried out immediately before, after, or during the aeration procedure. Stability of the corresponding chosen foamed aqueous composition can also be enhanced by the presence of a foam stabilizing agent as another (c) one or more additive.

Once the corresponding foamed aqueous composition has been formed, it can be disposed onto one supporting side (or planar surface) of a textile fabric substrate (described above). This procedure can be carried out in any suitable manner that does not undesirably diminish the foam density (or foam structure) of the corresponding foamed aqueous composition. For example, a planar surface of the textile fabric substrate can be coated with the corresponding foamed aqueous composition using any suitable known coating equipment (floating knife, hopper, blade, or gap) and coating procedures including but not limited to blade coating, gap coating, slot die coating, X-slide hopper coating, or "knife-over-roll" or knife over table operation, with or without tentering. For example, useful layer forming (coating) means are described in U.S. Pat. No. 4,677,016 (Ferziger et al.), the disclosure of which is incorporated herein by reference.

Thus, the corresponding foamed aqueous composition can be disposed directly onto an outer surface (such as the first supporting side) of the textile fabric substrate ("directly" means no intervening or intermediate layers) such as a woven cloth fabric, a fiberglass fabric, or a textile fabric with a mixture of the above.

Once the corresponding foamed aqueous composition has been disposed on a planar surface of the textile fabric substrate, it is generally dried to become "substantially" dry (to be defined in relation to the amount of water that is present), and at least partially cured (meaning the one or more (b) binder materials are at least partially cured or crosslinked), simultaneously or in any order, to provide a dry foamed composition (and single dry opacifying layer) having a desired dry coating weight and dry thickness on the first supporting side of the textile fabric substrate. Drying and at least partial curing can be accomplished by any suitable means such as ambient or heated air, microwaves, or IR irradiation at a temperature and time sufficient for at least drying and at least partial curing (for example, at less than 180° C.) to provide the dry weight and dry thickness of a dry layer.

The coating and drying operation is in some situations carried out on a tenter frame performs multiple functions. The foamed aqueous composition is disposed on the textile fabric substrate either while it is tentered with pins or clips widthwise, or while it is off the tenter frame. In either case after application of the wet foamed aqueous composition, the material is dried in a tentered manner while the frame passes through multiple drying chambers where hot air is blown above and below the material.

It is also possible to coat and dry without tentering in the widthwise direction.

Curing the (b) binder materials can be promoted by heat or radiation or other conditions to which the (b) binder materials are responsive for crosslinking. In some embodiments, a suitable functionalized latex composition is used as the (b) binder material. Upon heating, the (b) binder material(s) dries, and a possible curing or crosslinking reaction takes place between reactive side groups of suitable curable polymer chains. If the particular (b) binder material is not itself heat reactive, suitable catalysts or curing (crosslinking) agents can be added to the chosen foamable aqueous composition to promote curing or crosslinking.

After drying and at least partially curing, the dry layer on the textile fabric substrate is then crushed or densified thereon to form a densified single dry opacifying layer in the foamed, opacifying element. This process can be carried out in any suitable manner, but it is generally carried out by a process that provides pressure of at least 5 pounds per linear inch and up to and including 800 pounds per linear inch, for example, by passing the textile fabric substrate with the dry layer through a compression calendering operation, pressing operation, or embossing operation, or a combination thereof. For example, the textile fabric substrate and dry layer can be passed through a combination of calendering and embossing rollers to reduce the thickness and density of the foam in the dry foamed composition. The dry thickness of the dry foamed composition can be reduced by at least 20% based on the original dry layer thickness during such an operation. This process of crushing the dry foamed composition can be considered a "densifying operation" as the dry foamed composition is made denser when it is pressed together into a thinner layer. The dry thickness of the dry foamed composition before and after crushing (densifying) can be determined by a known technique such as laser profilometry.

The crushing or densifying process described above can be carried out at any suitable temperature including room temperature (for example, 20° C.) and up to and including 90° C., or more likely at a temperature of at least 20° C. and up to and including 80° C.

It is also possible to provide an embossed design on the outermost surface of the single dry opacifying layer of the foamed, opacifying element during the densifying operation such as for example, by patterned embossing or calendering, to create selected regions of high or low opacity and thickness. The resulting embossed design can be viewed from either side in transmission.

It is further possible to print images on the outer surface of the single dry opacifying layer of the foamed, opacifying element or on the backside (second supporting side) of the target porous substrate, or on both, using any suitable printing means such as inkjet printing or flexographic printing, thereby forming printed images of text, pictures, symbols, other objects, or combinations thereof. Such printed images can be visible, or they can invisible to the unaided eye (for example, using fluorescent dyes in the printed images). Alternatively, the single dry opacifying layer can be covered by printing or other means, with a colorless layer to provide a glossy finish.

A thermally printed image can be formed on either outer surface, for example, by using a thermal (sublimable) dye transfer printing process (using heat and with or without pressure) from one or more thermal donor elements comprising a dye donor layer comprising one or more dye sublimation printable colorants. For example, a thermal colorant image can be obtained using one or more thermal dye patches with or without a thermal colorless (clear) patch. Useful details of such a process to make thermally printed images are provided in commonly assigned U.S. Ser. No. 15/590,342 (filed May 9, 2017 by Nair and Herrick), now U.S. Pat. No. 10,145,061, the disclosures of which are incorporated herein by reference.

After densifying the dry foamed composition in the single dry opacifying layer, it can be subjected to conditions that promote further curing such as those conditions that are described above for the initial drying/curing operations.

System

The present invention also provides a system of features for carrying out the present invention in order to obtain a desired foamed, opacifying element having a target light blocking value ($LBV_T$).

This system comprises three essential features: (A) a set of two or more foamable aqueous compositions; (B) a set of mathematical formulae associated with the set of two or more foamable aqueous compositions of (A); and (C) a data processor for carrying out a method for generating the foamed, opacifying element with $LBV_T$ using (A) and (B).

(A) Foamable Aqueous Compositions:

A "set" of foamable aqueous compositions refers to a multiplicity or two or more of individual foamable aqueous compositions prepared with at least the five essential components (a) through (e) described above. Each foamable aqueous composition has at least 35% solids and up to and including 70% solids, independently of the other foamable aqueous compositions in the set. Thus, the multiple foamable aqueous compositions can have the same or different % solids.

In addition, while each of the multiple foamable aqueous compositions comprises each of the essential five (a) through (e) components, the amounts of each component can be the same or different, and in most instances, there is at least one feature that is different (either in kind or amount, or both) so that the set of foamable aqueous compositions are capable of providing a range of physical features (different opacity, dry thickness, color, or other properties described above) in resulting dry opacifying layers. The type or amount of optional components can also vary among the individual foamable aqueous compositions.

Moreover, the foam density of the individual foamed aqueous compositions can be the same or different within the set of foamable aqueous compositions. Since the foam density can influence coating weight, light blocking values, and other optical, physical, or chemical properties, foam density can be another parameter that is adjusted by the manufacturer of a foamed, opacifying element so as to meet a customer's desired specifications. For example, a higher foam density in the range described above can provide a thinner dry opacifying layer but yet a higher dry coating weight, whereas a lower foam density within that range can provide a thicker dry opacifying layer, but yet a lower dry coating weight, for the same $LBV_{T-S}$.

It would be understood that the set of foamable aqueous compositions can be used, upon foaming, to provide a set of corresponding foamed aqueous compositions.

(B) Set of Empirical Mathematical Formulae:

Each of the foamable aqueous compositions in the set described above has an empirical mathematical formula associated therewith, that is determined as described above in the "Method of Making Foamed, Opacifying Element" section. Each empirical mathematical formula relates dry coating weight of the respective foamable aqueous composition to a respective light blocking value of that foamable aqueous composition when it has been foamed, applied to a textile fabric substrate, dried, and crushed, all of which procedures are described above.

In order to obtain each mathematical formula, a chosen corresponding foamed aqueous composition is applied at different dry coating weights to samples of the same textile fabric substrate having a determined light blocking value ($LBV_S$). The actual dry coating weight and light blocking value of each foamed, opacifying element ($LBV_T$) can then be determined, and the $LBV_{T-S}$ values can be calculated. Each dry coating weight is then plotted versus $LBV_{T-S}$ and the best fit equation is determined using regression analysis as described above.

(C) Data Processor:

The method of the present invention can be carried out to provide a foamed, opacifying element having the target light blocking value ($LBV_T$) using a suitable data processor. This can be as simple as a LUT in which several dry coating weights are listed along with the corresponding light blocking values of the corresponding chosen foamed aqueous composition at that dry coating weight. The processor can also take the form of a computer program or spreadsheet in which the desired light blocking value and the textile fabric substrate serve as input and the chosen dry coating weight of the corresponding chosen foamed aqueous composition is provided as output.

In some embodiments, the textile fabric substrate is provided and the mathematical formula for each of the foamable aqueous compositions in the set is determined by considering or using various economic aspects or aesthetic aspects in the design of the method for making a desired foamed, opacifying element.

By "economic aspects," we mean for example, that instead of the same coating weight being applied to all textile fabric substrates, only the minimum amount of foamed aqueous composition needs to be applied when the $LBV_S$ is considered, thereby minimizing dry coating weight and waste of excess foamed aqueous composition.

By "aesthetic aspects," we mean for example, that inexpensive, lightweight fabrics can be made to feel and look more luxurious by applying a greater dry coating weight of the foamed aqueous composition onto those particular fabrics.

The following Examples are provided to illustrate the practice of this invention and are not meant to be limiting in any manner. The following materials were used in the various coating formulations and foamed, opacifying elements.

Materials Used to Make Representative Foamable Aqueous Compositions that can be Used in the Practice of the Present Invention:

The continuous polymeric phase polymers were the Eastman™ Cellulose Acetate Butyrate 381-0.5 (CAB), a cellulose ester, $T_g$ of 130° C. (obtained from Chem Point).

NALCO® 1060 containing colloidal silica was obtained from Nalco Chemical Company as a 50 weight % aqueous dispersion.

The poly(methylamino ethanol adipate) (AMAE) co-stabilizer was prepared using known procedures and starting materials.

Carboxy methylcellulose (CMC, 250,000 kDa) was obtained from Acros Organics or from Ashland Aqualon as Aqualon 9M31F. These products were used interchangeably.

The amphiphilic block copolymer of polyethylene oxide and polycaprolactone (PEO-b-PCL) 5K-20K, was prepared using the procedure described in U.S. Pat. No. 5,429,826 (Nair et al.) where the first number is the molecular weight of the hydrophilic block segment, PEO, and the second number is the molecular weight of the oleophilic block segment, PCL.

TERGITOL® 15-S-7, a C12-C14 secondary alcohol surfactant having an HLB value of 12.4, was obtained from the Dow Chemical Corp.

The optical brightener TINOPAL® OB CO was obtained from BASF Corporation.

The carbon black (K) opacifying colorant used as an aqueous dispersion was Black Pearls 880 (Cabot Corp.)

SOLSPERSE® 43000, a polyacrylate polymeric dispersant, was obtained from Lubrizol Corp.

The textile fabric substrates used in the Examples below were various woven polyester fabrics, having a weight of approximately 80-486 g/m².

The foamable aqueous composition (CF drapery compound) was made from a formulation comprising a self-crosslinking copolymer derived from n-butyl acrylate, ethyl acrylate, and N-methylol acrylamide using a known procedure, and having a glass transition temperature ($T_g$) of approximately −25° C. as the (b) binder material from which the (b') matrix material was derived, (c) additives titanium dioxide, clay filler, a flame retardant, and surfactants for foam creation and stabilization.

Measurements:

The mode particle size of the (a) porous particles was measured using a Sysmex FPIA-3000 automated particle size analyzer from Malvern Panalytical. The particle size of the dispersed pigments was determined using light scattering.

The porosity of the (a) porous particles was measured using a modified version of the known mercury intrusion porosimetry method.

The light blocking ability of each foamed, opacifying element in the Examples, in transmitted light, was evaluated by measuring its light blocking value ($LBV_T$) using a custom-built apparatus consisting of a fiber optic light source, a computer controlled translational stage, and an optical photometer. The fiber optic was positioned 10 mm above the surface of the fabric. A photodetector was placed on the other side of each sample element directly under the fiber optic in order to quantify the amount of light that passed through the sample element. The $LBV_T$ of each element sample was calculated by comparing the light that passed through the element sample to the light that reached the detector when no element sample was present.

Preparation of Pigment Dispersions for Porous Particles:

The carbon black pigment (opacifying colorant) dispersion was prepared by combining dry pigment, SOLSPERSE® 43000 dispersant, and an aqueous medium in a suitable milling vessel. The particle size of the pigment was reduced by milling it using ceramic media until all pigment particles were reduced below a diameter of 1 μm as determined by optical microscopy. The dispersions were further diluted as necessary using the same aqueous medium to provide dispersion D-K particle size 100 nm for incorporation into (a) porous particles.

Preparation of (a) Porous Particles:

The (a) porous particles PP used for preparing a foamed, opacifying element contained 1 weight % of optical brightener (identified below) in the continuous CAB polymeric phase and 0.8 weight % opacifying colorant (K) in the discrete pores.

An aqueous phase was made up by dissolving 5 grams of CMC in 240.5 grams of distilled water and adding to it 4.3 grams of the dispersion containing 18.6 weight % of carbon black. This aqueous phase was dispersed in 831.8 grams of an oil phase containing 97.7 grams of CAB, 2 grams of PEO-b-PCL, and 1 gram of the optical brightener, TINOPAL® OB CO in ethyl acetate, using a homogenizer. A 975-gram aliquot of the resulting water-in-oil emulsion was dispersed using the Silverson L4R homogenizer for two minutes at 1200 RPM, in 1625 grams of a 200 mmolar pH 4 acetate buffer containing 39 grams of NALCO® 1060 colloidal silica, and 9.75 grams of AMAE co-stabilizer followed by homogenization in an orifice homogenizer at 1000 psi (70.4 kgf/cm²) to form a water-in-oil-in-water double emulsion. The ethyl acetate was removed under reduced pressure at 40° C. after dilution of the water-in-oil-in-water emulsion with an equal weight of water. The resulting suspension of solidified porous particles was filtered, and the isolated porous particles were washed with water several times, followed by rinsing with a 0.05 weight % solution of TERGITOL® 15-S-7 surfactant. The isolated porous particles were then air dried. They had a mode particle size of 5.4 μm and a porosity of 46 volume %. Typically, the discrete pores contained within the porous particles prepared according to this procedure had an average diameter of from 150 nm and up to and including 1,500 nm. The moisture content of the final powder was 50%.

Preparation of Foamable Aqueous Compositions; Foamed Aqueous Compositions; and Foamed, Opacifying Element:

Representative foamable aqueous compositions that can be included in a "set" of foamable aqueous compositions are described as follows.

In general, each foamable aqueous composition was made by incorporating the appropriate (a) porous particles PP in an approximately 50 weight % solids a specific foamable drapery compound. (a) Porous particles PP were dispersed into the mixture by stirring at 1200 rev/minute with a 50 mm diameter Cowles blade at ambient temperature for 30-60 minutes. The resulting foamable aqueous composition was used to prepare a foamed aqueous composition under pressure using an Oakes 2M Laboratory Mixer Model 2MBT1A. Each resulting foamed aqueous composition, having a density of from 0.20 g/cm³ to 0.25 g/cm³, was coated onto a surface of the textile fabric substrate described above using a coating knife, dried at a temperature of from 120° C. to 160° C. until the moisture content was less than 2 weight %, and crushed ("densified") on the textile fabric substrate between hard rollers under suitable pressure so that the "final" dry thickness was at least 20% less than the original dry thickness. The dry foamed composition (dry opacifying layer) was further cured at 160° C. for 2 minutes to crosslink the (b) binder material and form the resulting (b') matrix material and form the foamed opacifying element.

Invention Examples 1-24

Estimated (Predicted) Vs. Measured Dry Coating Weights for Target Light Blocking Values of Foamed, Opacifying Elements A suitable chosen foamable aqueous composition for providing the required physical properties was prepared as described for the foamed, opacifying element described above, foamed and coated at various dry coating weights (g/m² using a lab scale 10 inch-wide, untentered roll to roll coating configuration onto the a first supporting side of textile fabric substrate A, having a measured light blocking value $LBV_S$ of 0.5. The light blocking value, $LBV_T$ of each resulting foamed, opacifying element was then measured, and the respective $LBV_{T-S}$ values were calculated. These respective $LBV_{T-S}$ values were then plotted (y axis) against the dry coating weights (y axis) of the coated foam and the mathematical formula in the form of the best fit equation was determined using regression analysis for that foamable composition. The following equation shows the obtained formula:

Dry Coating Weight (g/m²)=1.4133*$LBV_{T-S}^2$+ 25.102*$LBV_{T-S}$ $R^2$=0.9913

The above equation was used to predict the dry coating weight, using the same chosen foamable aqueous composition as was applied to textile fabric substrate A and coated using the same coating configuration and from which the equation was generated, required to obtain target $LBV_T$ for various textile fabric substrates (Invention Example 1 through Invention Example 13) of different weaves, patterns, color, basis weight, and opacity, different from the textile fabric A and whose light blocking value $LBV_S$ was at least 0.1 and up to and including 5.0. The $LBV_S$ values of the various textile fabric substrates were at first measured and the $LBV_{T-S}$ values calculated. From the equation shown above the dry coating weights required to obtain the target $LBV_{T-S}$ values were predicted. The difference between the actual and predicted dry coating weights were calculated and the percent difference calculated by dividing that number by the predicted dry coating weight. See the details in the following TABLE 1.

above for the foamed, opacifying element and coated at various dry coating weights (g/m²) using a 60-inch wide manufacturing configuration onto the a first supporting side of the textile fabric substrate A, having a measured light blocking value $LBV_S$ of 0.5. The empirical equation obtained as described above is shown as follows:

$$\text{Dry Coating Weight (g/m}^2\text{)} = -0.1394 LBV_{T-S}^2 + 37.517 * LBV_{T-S}$$

$$R^2 = 0.9952.$$

The following TABLE 2 shows the predicted and actual dry coating weights for single dry opacifying layers, for various textile fabric substrates (Invention Example 14 through Invention Example 24) of different weaves, pat-

TABLE 1

| Invention Example Number | Description of Fabric | Fabric weight g/m² | Dry coating weight g/m² | $LBV_T$ Fabric + Dry Coating | $LBV_S$ | $LBV_{T-S}$ | Dry coating weight predicted g/m² | Dry coating weight g/m² actual-predicted | Dry coating weight % diff |
|---|---|---|---|---|---|---|---|---|---|
| 1 | Velvet | 308 | 91 | 7.6 | 4.4 | 3.2 | 94 | -2.5 | -2.7 |
| 2 | Chintz Glaze | 88 | 204 | 6.6 | 0.6 | 6.1 | 204 | 0.7 | 0.3 |
| 3 | Textured tight weave | 189 | 205 | 6.9 | 0.7 | 6.2 | 211 | -5.9 | -2.8 |
| 4 | Plain texture tight weave | 301 | 193 | 7.6 | 1.7 | 5.8 | 193 | 0.1 | 0.0 |
| 5 | Solid plain texture | 223 | 221 | 7.7 | 1.1 | 6.6 | 228 | -6.7 | -2.9 |
| 6 | Chenille | 428 | 183 | 7.3 | 1.8 | 5.6 | 183 | -0.5 | -0.2 |
| 7 | Sateen | 203 | 179 | 7.3 | 1.9 | 5.4 | 176 | 3.0 | 1.7 |
| 8 | Upholstery | 253 | 186 | 7.3 | 2.0 | 5.3 | 173 | 13.6 | 7.9 |
| 9 | Upholstery | 328 | 169 | 7.6 | 1.9 | 5.7 | 188 | -18.8 | -10.0 |
| 10 | Upholstery | 447 | 176 | 7.7 | 2.0 | 5.7 | 189 | -13.6 | -7.2 |
| 11 | Upholstery | 239 | 212 | 7.9 | 1.7 | 6.2 | 211 | 1.3 | 0.6 |
| 12 | Upholstery | 274 | 131 | 7.3 | 3.1 | 4.2 | 132 | -0.7 | -0.5 |
| 13 | Upholstery | 347 | 163 | 7.7 | 2.6 | 5.1 | 166 | -3.7 | -2.2 |

Using another coating configuration where the fabric was biaxially stretched (tentered) during coating and drying, the same chosen foamable aqueous composition for providing the required physical properties was prepared as described terns, color, basis weight, and opacity, different from the textile fabric substrate A and whose light blocking value $LBV_S$ was at least 0.1 and up to and including 5.0 that were coated sing a different configuration.

| Fabric Invention Example | Fabric Type | Fabric weight g/m² | Dry coating weight g/m² | $LBV_T$ Fabric + Coating | $LBV_S$ | $LBV_{T-S}$ actual | Dry coating weight predicted g/m² | Dry coating weight actual-predicted g/m² | Dry coating weight % diff |
|---|---|---|---|---|---|---|---|---|---|
| 14 | Loose weave upholstery | 283 | 194 | 6.1 | 1.3 | 4.8 | 177 | 16.4 | 9.3 |
| 15 | Loose weave upholstery | 302 | 185 | 5.6 | 1.0 | 4.7 | 172 | 12.6 | 7.3 |
| 16 | Loose weave upholstery | 282 | 169 | 6.6 | 2.1 | 4.5 | 165 | 3.1 | 1.9 |
| 17 | Loose weave upholstery | 289 | 164 | 7.0 | 2.4 | 4.6 | 171 | -7.8 | -4.6 |
| 18 | Upholstery | 277 | 170 | 5.8 | 1.2 | 4.58 | 169 | 0.8 | 0.5 |
| 19 | Upholstery | 274 | 200 | 7.2 | 1.8 | 5.4 | 198 | 2.4 | 1.2 |
| 20 | Upholstery | 261 | 216 | 6.7 | 1.2 | 5.5 | 204 | 12.3 | 6.0 |
| 21 | Upholstery | 262 | 206 | 6.7 | 1.2 | 5.6 | 204 | 1.9 | 0.9 |
| 22 | Linen weave | 167 | 144 | 4.4 | 0.6 | 3.8 | 142 | 2.3 | 1.6 |

| Fabric Invention Example | Fabric Type | Fabric weight g/m² | Dry coating weight g/m² | LBV$_T$ Fabric + Coating | LBV$_S$ | LBV$_{T-S}$ actual | Dry coating weight predicted g/m² | Dry coating weight actual-predicted g/m² | Dry coating weight % diff |
|---|---|---|---|---|---|---|---|---|---|
| 23 | Linen weave | 167 | 207 | 5.9 | 0.6 | 5.3 | 196 | 10.0 | 5.1 |
| 24 | Double cloth jacquard | 204 | 211 | 6.4 | 1.1 | 5.2 | 193 | 18.3 | 9.5 |

The data shown in TABLES 1 and 2 support the following understanding and conclusions about the presently claimed invention. TABLES 1 and 2 provide information on the various textile fabric substrates, LBV$_{T-S}$ and calculated and actual dry coating weights for each experiment performed using the same chosen formula but under different coating configurations. It can be seen that the difference between the actual (measured) and predicted values of dry coating weights were less than +15%, thereby forming foamed, opacifying elements having the dry coating weights with very acceptable outcomes.

Thus, the data show that with the present invention, we have created an effective look-up table, using which a manufacturing operation for coating foamed opacifying layers on a variety of textile fabric substrates can be simplified by predicting the dry coating weights.

The invention has been described in detail with particular reference to certain preferred embodiments thereof, but it will be understood that variations and modifications can be effected within the spirit and scope of the invention.

The invention claimed is:

1. A method for providing a foamed, opacifying element having a target light blocking value (LBV$_T$) and required physical properties, the foamed, opacifying element comprising a textile fabric substrate having a first supporting side and an opposing second supporting side, the method comprising:
providing a textile fabric substrate;
determining a light blocking value (LBV$_S$) of the textile fabric porous substrate;
choosing a target light blocking value (LBV$_T$) of at least 3 and greater than LBV$_S$;
calculating LBV$_{T-S}$ as a difference between LBV$_T$ and LBV$_S$;
choosing a foamable aqueous composition that provides the required physical properties in the foamed, opacifying element;
using an empirical mathematical formula to determine a dry coating weight of a single dry opacifying layer derived from the chosen foamable aqueous composition, of at least 40 g/m² and up to and including 300 g/m², in order to achieve the calculated LBV$_{T-S}$;
foaming the chosen foamable aqueous composition to form a foamed aqueous composition having a foam density of at least 0.1 g/m³ and up to and including 0.4 g/cm³;
applying an amount of the foamed aqueous composition to the first supporting side of the textile fabric substrate,
drying the applied foamed aqueous composition to provide the dry coating weight and a dry thickness of a dry layer; and
densifying the dry layer at a crushing pressure of at least 5 pounds per linear inch and up to and including 800 pounds per linear inch such that the dry layer dry thickness is reduced by at least 20%,
to form the single dry opacifying layer disposed on the first supporting side of the textile fabric substrate, such that the single dry opacifying layer has a light blocking value that is equal to LBV$_{T-S}$, +/−15%, thereby forming the foamed, opacifying element having the target light blocking value (LBV$_T$)+/−15%.

2. The method of claim 1, wherein the chosen foamable aqueous composition has at least 35% solids and up to and including 70% solids, and comprises:
   (a) at least 0.05 weight % and up to and including 35 weight % of porous particles, each porous particle comprising a continuous polymeric phase and a first set of discrete pores dispersed within the continuous polymeric phase, the porous particles having a mode particle size of at least 2 μm and up to and including 50 μm and a porosity of at least 20 volume % and up to and including 70 volume %, and the continuous polymeric phase having a glass transition temperature at least 25° C.;
   (b) at least 20 weight % of a binder material;
   (c) at least 0.0001 weight % of one or more additives comprising at least one surfactant;
   (d) water; and
   (e) at least 0.001 weight % of an opacifying colorant different from all of the (c) one or more additives, which opacifying colorant absorbs predetermined electromagnetic radiation,
   all amounts being based on the total weight of the chosen foamable aqueous composition.

3. The method of claim 1, wherein the textile fabric substrate has a light blocking value (LBV$_S$) of at least 0.1 and up to and including 5.0.

4. The method of claim 1, wherein the foamed, opacifying element has a luminous reflectance that is greater than 40% as measured by the Y tristimulus value.

5. The method of claim 1, wherein the textile fabric substrate comprises a textile fabric web.

6. The method of claim 2, wherein the chosen foamable aqueous composition comprises a tinting colorant, a flame retardant, an antimicrobial agent, or a flocking agent as a (c) one or more additive.

7. The method of claim 2, wherein the continuous polymeric phase comprises at least 70 weight %, based on the total polymer weight in the continuous polymeric phase, of one or more polyesters or of one or more polymers derived from one or more of cellulose acetate, cellulose butyrate, cellulose acetate butyrate, and cellulose acetate propionate.

8. The method of claim 2, wherein the (e) opacifying colorant is a carbon black that is present in an amount of at least 0.003 weight % and up to and including 0.2 weight %, based on the total weight of the chosen foamable aqueous composition.

9. The method of claim 2, wherein the chosen foamable aqueous composition comprises at least 0.5 weight % and up to and including 10 weight % of the porous (a) particles, based on the total weight of the chosen foamable aqueous composition, which (a) porous particles have a mode particle size of at least 3 μm and up to and including 30 μm.

10. The method of claim 2, wherein the surfactant of the (c) one or more additives is a foaming agent and the (c) one or more additives further comprise a foam stabilizing agent.

11. The method of claim 2, wherein the (c) one or more additives further comprise an optical brightener in an amount of at least 0.01 weight % and up to and including 2 weight %, based on the total weight of the chosen foamable aqueous composition.

12. The method of claim 2, wherein the (c) one or more additives comprise an antimicrobial agent comprising silver metal, a silver-containing compound, copper metal, a copper-containing compound, or a mixture of any of these.

\* \* \* \* \*